United States Patent
Pratt et al.

(10) Patent No.: US 12,373,733 B2
(45) Date of Patent: Jul. 29, 2025

(54) FACILITATING SELECTION OF CATEGORICAL FEATURES IN MACHINE LEARNING

(71) Applicant: AT&T Intellectual Property I, L.P., Atlanta, GA (US)

(72) Inventors: James Pratt, Round Rock, TX (US); Abhay Dabholkar, Allen, TX (US); Vladimir Sevastyanov, Fort Worth, TX (US); Nikhlesh Agrawal, McKinney, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 938 days.

(21) Appl. No.: 17/467,670

(22) Filed: Sep. 7, 2021

(65) Prior Publication Data
US 2023/0076592 A1 Mar. 9, 2023

(51) Int. Cl.
| | |
|---|---|
| *G06N 20/00* | (2019.01) |
| *G06F 17/11* | (2006.01) |
| *G06F 17/18* | (2006.01) |
| *G06F 18/21* | (2023.01) |
| *G06F 18/2113* | (2023.01) |

(52) U.S. Cl.
CPC ............ *G06N 20/00* (2019.01); *G06F 17/11* (2013.01); *G06F 17/18* (2013.01); *G06F 18/2113* (2023.01); *G06F 18/2193* (2023.01)

(58) Field of Classification Search
None
See application file for complete search history.

(56) References Cited

U.S. PATENT DOCUMENTS

| | | | |
|---|---|---|---|
| 2012/0089592 A1* | 4/2012 | Hollingsworth | G06F 16/31 707/711 |
| 2018/0128619 A1* | 5/2018 | Herberth | G01S 19/49 |

* cited by examiner

*Primary Examiner* — Matthew G Marini
(74) *Attorney, Agent, or Firm* — Guntin & Gust, PLC; Miyoung Shin

(57) ABSTRACT

Facilitating selection of the most significant set of categorical features in machine learning is provided herein. Operations of a system include determining a list of unique values of a categorical variable. The operations also include calculating respective mean values, of a target variable, for unique values of the list of unique values of the categorical variable. Further, the operations include sorting the list of unique values by the respective mean values, resulting in a sorted list. The operations also include calculating respective derivatives of the respective mean values in the sorted list considering the respective mean values as a function and a number of the respective mean values in the sorted list as an independent variable. Additionally, the operations include determining a minimum derivative value over the sorted list and outputting the minimum derivative value as a resulting variable significance value.

20 Claims, 17 Drawing Sheets

FACILITATING SELECTION OF CATEGORICAL FEATURES IN MACHINE LEARNING

TECHNICAL FIELD

This disclosure relates generally to the field of machine learning and, more specifically, to facilitating selection of categorical features for building machine learning models.

BACKGROUND

When building a machine learning model, it is rare that all the variables in the dataset are useful to build the model. Adding redundant variables reduces the generalization capability of the model and can also reduce the overall accuracy of the model. Furthermore, adding more and more variables to a model increases the overall complexity of the model. As per the Law of Parsimony of "Occam's Razor," the best explanation to a problem involves the fewest possible assumptions. Accordingly, feature selection becomes an important part of building machine learning models and unique opportunities exist related to such feature selection.

BRIEF DESCRIPTION OF THE DRAWINGS

Various non-limiting embodiments are further described with reference to the accompanying drawings in which.

DETAILED DESCRIPTION

Figure 1:
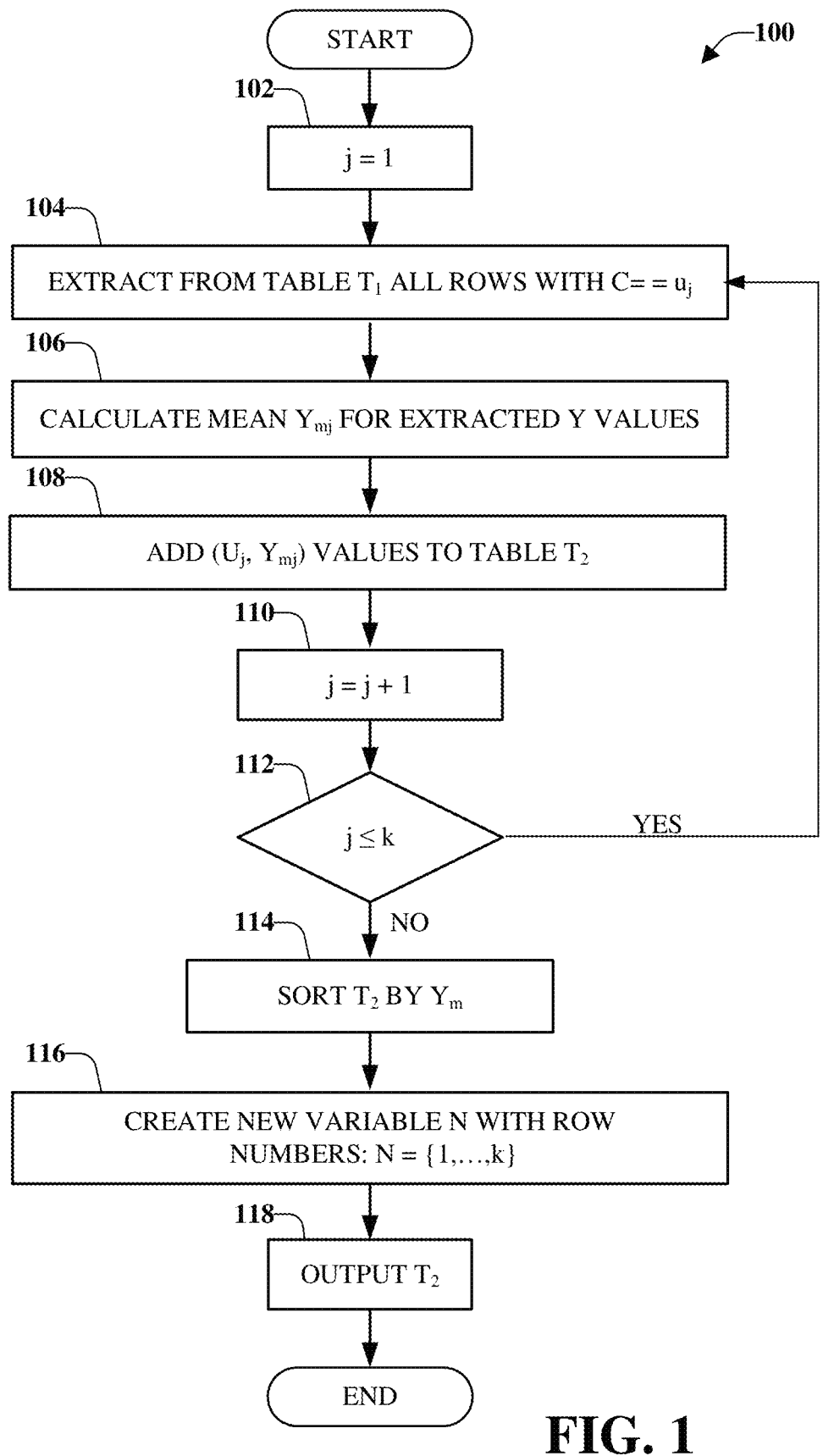
FIG. 1 illustrates an example, non-limiting, computer-implemented method for transforming categorical variables to numerical variables in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Described herein are systems, methods, articles of manufacture, and other embodiments or implementations that can facilitate selection of the most significant set of categorical features in machine learning. Categorical variables take on values that are names or labels. Non-limiting examples of categorical variables include the color of a ball (where the individual colors {e.g., red, green, blue} are categories of the categorical variable color of balls) or the breed of dog (where the individual breeds {e.g., collie, shepherd, terrier} are categories of the categorical variable breed of dogs). In an implementation, there can be thousands of categorical variables C $\{c_1, c_2, \ldots c_N\}$ and a single target numerical variable Y. Based on these categorical variables and single target numerical variable, a predictive model $Y=f(C)$ is to be built.

It is not practical to use hundreds and thousands of features to build predictive models because of, for example, dimensionality and overfitting problem, as well as an inability to explain the model when there is a large number of features. Also, many features make a model bulky, take a tremendous amount of time to process, and are harder to implement in production.

Data science uses feature selection (FS), which allows for the identification of significant variables while filtering out unsignificant variables. Existing FS methods can be used for numerical data. There are FS methods applicable for categorical features, however, at least one of these FS methods was created in the nineteenth century for small data sets and is based on very strict (not practical) assumptions. Another FS method is resource consuming and does not guarantee reliable valid results for real life tasks.

The above described existing FS methods do not work for categorical features. Values of a categorical variable compose an unordered set, which does not allow for numerical analyzation of these values. A purpose of the embodiments provided herein is to convert categorical variables to numerical variables, and then apply methods of numerical analysis to the numerical variables.

Data science, in general, is concerned with data processing and data analysis. Data analysis assumes the use of numerical data. However, a majority of real data are textual and categorical. How to resolve this obstacle and apply methods of numerical analysis to textual and categorical data is provided with the various embodiments herein.

By way of example and not limitation, NLP (natural language processing) processes substitute words by the respective frequencies of the words in a given document and create a numerical matrix. Then, the NLP applies methods of numerical analysis. This approach is successful and NLP results can be impressive but are limited in their application.

Provided herein is a way to transform values of categorical variable C to numerical variables. Since significance of the variable C should be estimated against a given target variable Y, categorical-to-numerical transformation processes should link both variables together.

An embodiment relates to a method that includes determining, by a system including a processor, a list of unique values of a categorical variable. The method also includes calculating, by the system, respective mean values, of a target variable, for unique values of the list of unique values of the categorical variable. Further, the method includes sorting, by the system, the list of unique values by the respective mean values, resulting in a sorted list. The method also includes calculating, by the system, respective derivatives of the respective mean values in the sorted list considering the respective mean values as a function and a number of the respective mean values in the sorted list as an independent variable. Additionally, the method includes determining, by the system, a minimum derivative value over the sorted list and outputting, by the system, the minimum derivative value as a resulting variable significance value.

According to an implementation, the method can include, prior to the outputting, calculating, by the system, the resulting variable significance value as a mean of derivative. In some implementations, the calculating of the respective derivatives can include calculating the respective derivatives as a slope based on determining a ratio of the mean values change to an item number change between any two items on the list.

The method can include, according to some implementations, calculating, by the system, a quadratic mean value of the target variable for each unique value of the categorical variable. Alternatively, the method can include, according to some implementations, calculating, by the system, an arithmetic mean value of the target variable for each unique value of the categorical variable.

The method can include, in some implementations, calculating, by the system, a geometric mean value of the target variable for each unique value of the categorical variable. In an alternative implementation, the method can include calculating, by the system, a weighted arithmetic mean value of the target variable for each unique value of the categorical variable. In some implementations, the method can include calculating, by the system, a weighted arithmetic mean value of the target variable normalized by a normalization process.

Another embodiment relates to a method that can include determining, by a system including a processor, a list of categorical variables. The method also can include estimating, by the system, respective significances of categorical variables of the list of categorical variables. Further, the method can include filtering, by the system, categorical variables with a significance value that satisfies a threshold value and outputting, by the system, a resulting list as the most significant variables.

In some implementations, the method can include sorting, by the system, the categorical variables by respective significance values in descending order. Further to these implementations, the method can include selecting, by the system, a defined number of variables of the categorical variables, wherein the categorical variables including a biggest significance value are selected, resulting in a determined list of the most significant categorical variables.

The estimating can include, determining a list of unique values of a categorical variable, calculating respective mean values, of a target variable, for unique values of the list of unique values of the categorical variable, and sorting the list of unique values by the respective mean values, resulting in a sorted list. Further, the method can include calculating respective derivatives of the respective mean values in the sorted list considering the respective mean values as a function and a number of the respective mean values in the sorted list as an independent variable. Additionally, the method can include determining a minimum derivative value over the sorted list and outputting the minimum derivative value as a resulting variable significance value.

FIG. 1 illustrates an example, non-limiting, computer-implemented method 100 for transforming categorical variables to numerical variables in accordance with one or more embodiments described herein. The computer-implemented method 100 can be implemented by a system including a processor, network equipment including a processor, or another computer-implemented device including a processor.

A table is an arrangement of data, where the data is arranged in rows and columns, or in a more complex structure. Thus, a table is used to organize strings, numbers, dates, and other data in a rectangular table structure. Input data can include information from first table $T_1$. The first table $T_1$ can include two variables (C, Y) for purposes of this example. Accordingly, first table $T_1$ has K rows and C is a categorical variable. Further, C has K values totally, and k unique values $\{u_1, u_2, \ldots u_k\}$, k<<K. Y is numerical variable and has K values (real or integer numbers).

Output data of the computer-implemented method 110 includes a second table $T_2$. Table $T_2$ can include three variables (C, N, and Ym). The table size of Table $T_2$ is reduced as compared to Table $T_1$. For example, Table $T_2$ has k rows, k<<K. Variable C includes just k unique values of the categorical variable. Variable Ym includes k mean values for each category. Variable N is the resulting numerical variable, which substitutes categorical variable C.

With continuing reference to FIG. 1, in order to estimate the impact (significance) of a given categorical variable C on the target variable Y, the categorical variable C should be converted into a numerical variable N.

As mentioned in the paragraph above, categorical variable C has K values totally, and k unique values: $C=\{u_1, u_2, \ldots u_k\}$, k<<K. Further, target variable Y has K numerical values. The computer-implemented method 100 of FIG. 1 transforms categorical variable C into a numerical variable N.

In further detail, at 102, choose the very first unique category u1 from the categorical variable C; j=1, where j is the number of category within a categorical variable. At 104, extract from input table $T_1$ all rows with $C==u_j$, where $u_j$ is one unique value of the unique values of the categorical variable C. After the extraction, there is now a small table with two columns. A first column contains the same category $u_j$ and a second column contains several values $Y_j$ of the target variable Y.

The average value $Y_{mj}=\text{mean}(Y_j)$ for all extracted values $Y_j$ of the target variable Y can be calculated at 106. $Y_{mj}$ is a mean value of the target variable Y for all its values corresponded to the same category $u_j$.

At 108, the computer-implemented method 100 can add the $(U_j, Y_{mj})$ values to a second table (table $T_2$). Then, at 110, j can be set to be equal to the result of j+1. Thereafter, a determination can be made, at 112, whether j is less than or equal to k (e.g., j≤k). If j is less than or equal to k ("YES"), the computer-implemented method 100 returns to 104, via a feedback loop, and a next (or subsequent) unique category $u_j$ can be selected and another extraction can be performed on a second (or subsequent) set of data, and so on.

If the determination at 114 is that j is more than k ("NO"), at 114, table $T_2$ is sorted by Ym. Sorting allows for the creation of a new set of row numbers in the table $T_2$: N={1, . . . , k}, at 116. Table $T_2$ is output at 118. The numerical variable N is the result of transformation of categorical variable C into a numerical variable.

According to an implementation, instead of row number N=(1, . . . , k), a different type of normalization can be utilized. For example, N={1/k, 2/k, . . . k/k}. In another implementation, instead of mean($Y_j$) (average) value, a quadratic mean, arithmetic mean, geometric mean, weighted arithmetic mean, and so on, can be utilized.

Figure 2:
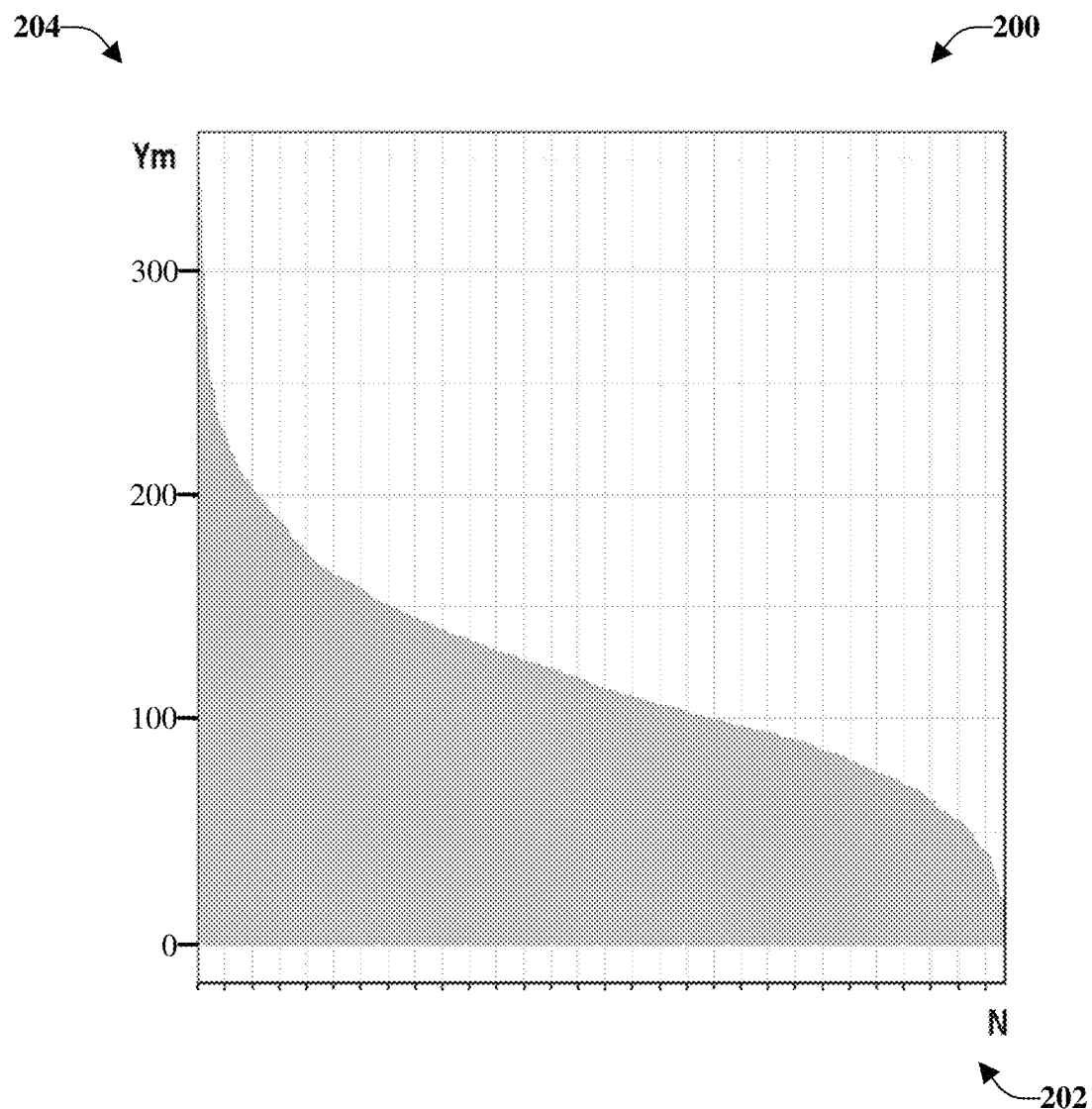
FIG. 2 illustrates an example, non-limiting, diagram derived by the computer-implemented method of FIG. 1 in accordance with one or more embodiments described herein.

FIG. 2 illustrates an example, non-limiting, diagram 200 derived by the computer-implemented method 100 of FIG. 1 in accordance with one or more embodiments described herein. Illustrated on the horizontal axis 202 is variable N and illustrated on the vertical axis 204 is variable Ym. For example, the diagram 200 illustrates the dependency Ym=ƒ(N). Sorting the table $T_2$ by Ym (e.g., at 114 of computer-implemented method 100) can make the dependency smooth and monotonic, which can be convenient to perform numerical analysis, as discussed herein.

Figure 3:
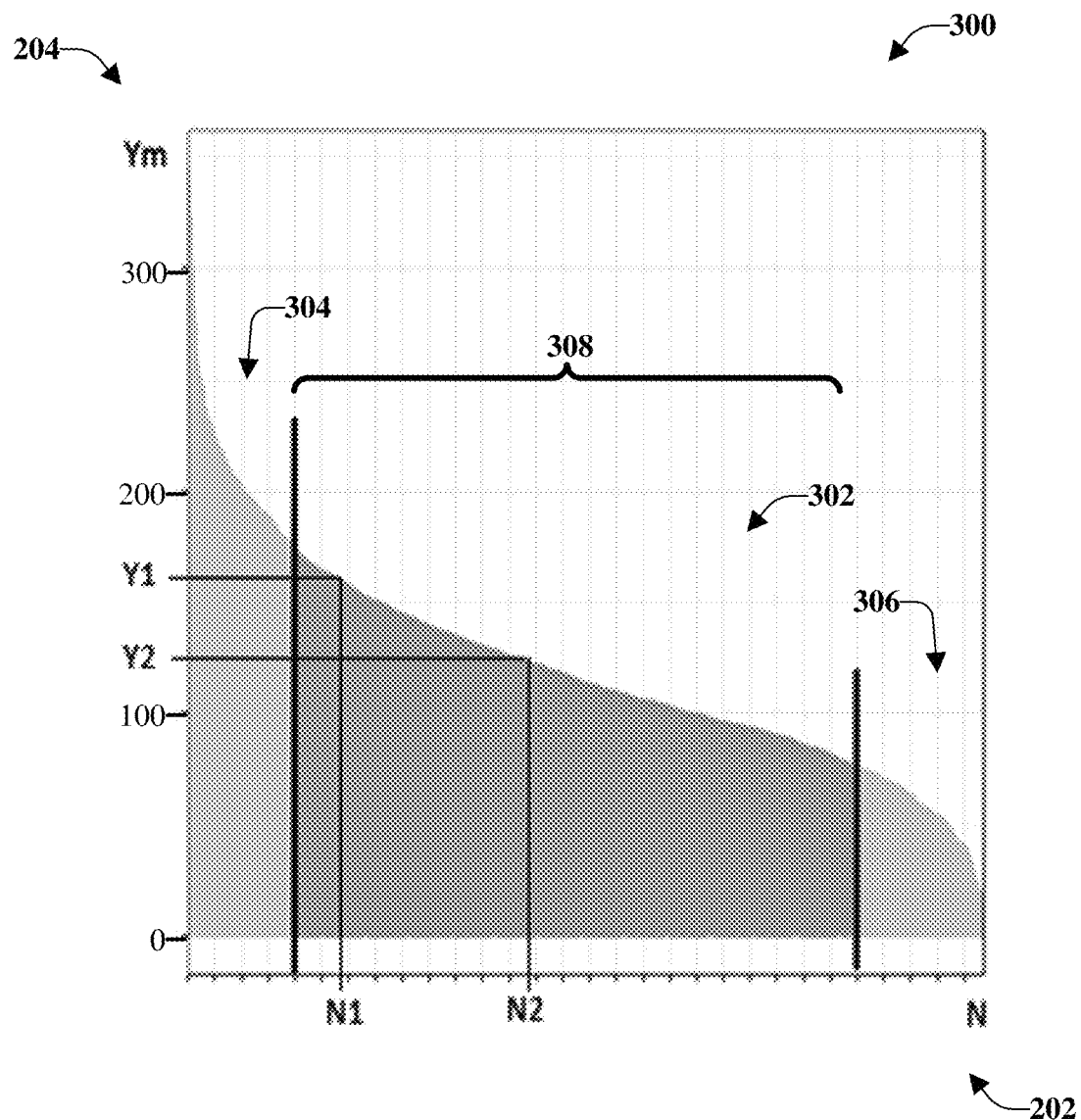
FIG. 3 illustrates an example, non-limiting, diagram of a typical distribution of target variable Ym values over the entire range of the categorical value index N in accordance with one or more embodiments described herein.

FIG. 3 illustrates an example, non-limiting, diagram 300 of a typical distribution of target variable Ym values over the entire range of the categorical value index N in accordance with one or more embodiments described herein. Repetitive description of like elements employed in other embodiments described herein is omitted for sake of brevity.

Illustrated on the horizontal axis 202 is variable N and illustrated on the vertical axis 204 is variable Ym. The distribution 302 of all Ym values is shown. A left tail 304 and a right tail 306 of the distribution represent relatively small number of categories C. The majority of categories belong to the middle part 308 of the distribution. It is noted that the portions of the diagram 300 referred to as the left tail 304 and the right tail 306 correspond to fast change of the target variable Ym. The middle part 308 of the distribution corresponds to slow change of the target variable.

FIG. 3 illustrates also how slope can be estimated according to Equation 1 below. The distribution represents a slope. Two points are indicated on the function Y=F(N), namely the intersection of Y1 and N1 (e.g., a first point in the line) and the intersection of Y2 and N2 (e.g., a second point in the line). It is noted that there can be hundreds, or even thousands, of points along the curve. However, two points are depicted for simplicity purposes. Slope can be calculated according to the following formula:

$$\text{Slope} = \frac{\Delta Y}{\Delta N} = \frac{y_2 - y_1}{N_2 - N_1}. \qquad \text{Equation 1}$$

where $(N_1, Y_1)$ are coordinate of a first point in the line and $(N_2, Y_2)$ are coordinates of a second point in the line. The slope can be considered as an estimation of derivative for the function Y=F(N). According to various implementations, any numerical method of derivatives estimation can be applied instead of the one discussed herein.

Intuitively, it is clear that the slope of the distribution curve is tightly related to the variable significance. If the slope is very small, then the variable does not make a noticeable difference (e.g., it is irrelevant). If the slope in the middle part 308 has a relatively large positive value, then the variable strongly impacts Ym, and can be considered as significant.

Figure 4:
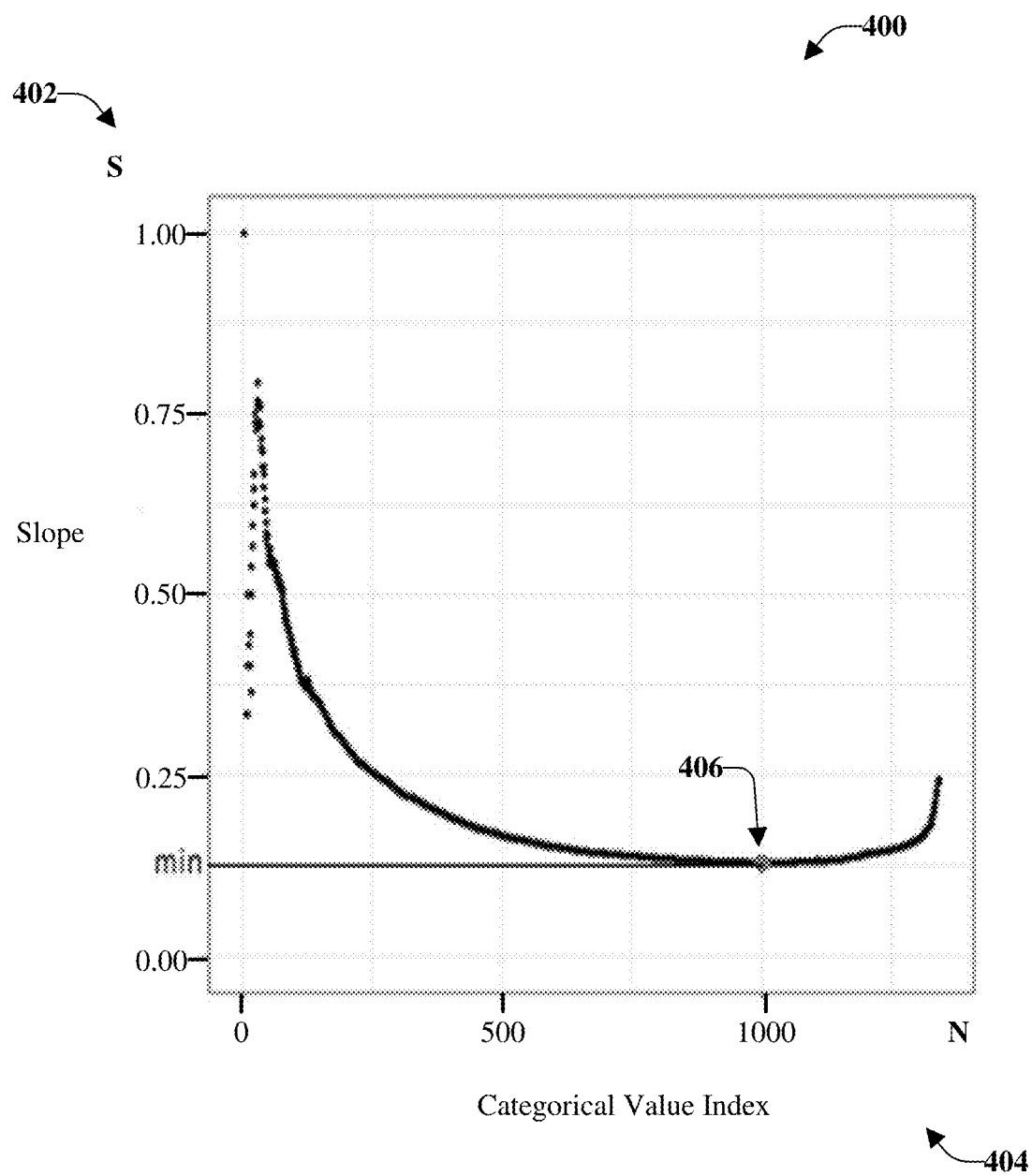
FIG. 4 illustrates an example, non-limiting, slope diagram of the function Y=F(N) on the diagram slope diagram of FIG. 3 in accordance with one or more embodiments described herein.

FIG. 4 illustrates an example, non-limiting, slope diagram 400 of the function Y=F(N) on the diagram of FIG. 3 in accordance with one or more embodiments described herein. The slope diagram 400 illustrates how slope (derivative) depends on N, which is categorical value index. Slope 402 is illustrated on the vertical axis and the categorical value index 404 is illustrated on the horizontal axis. Slope minimum is indicated by point 406.

Based on observation of multiple diagrams similar to FIG. 3 and FIG. 4 for different categorical variables, it has been determined that two functionals can be used as measures of significance. These two functionals include (1) slope minimum and (2) slope average.

Figure 5:
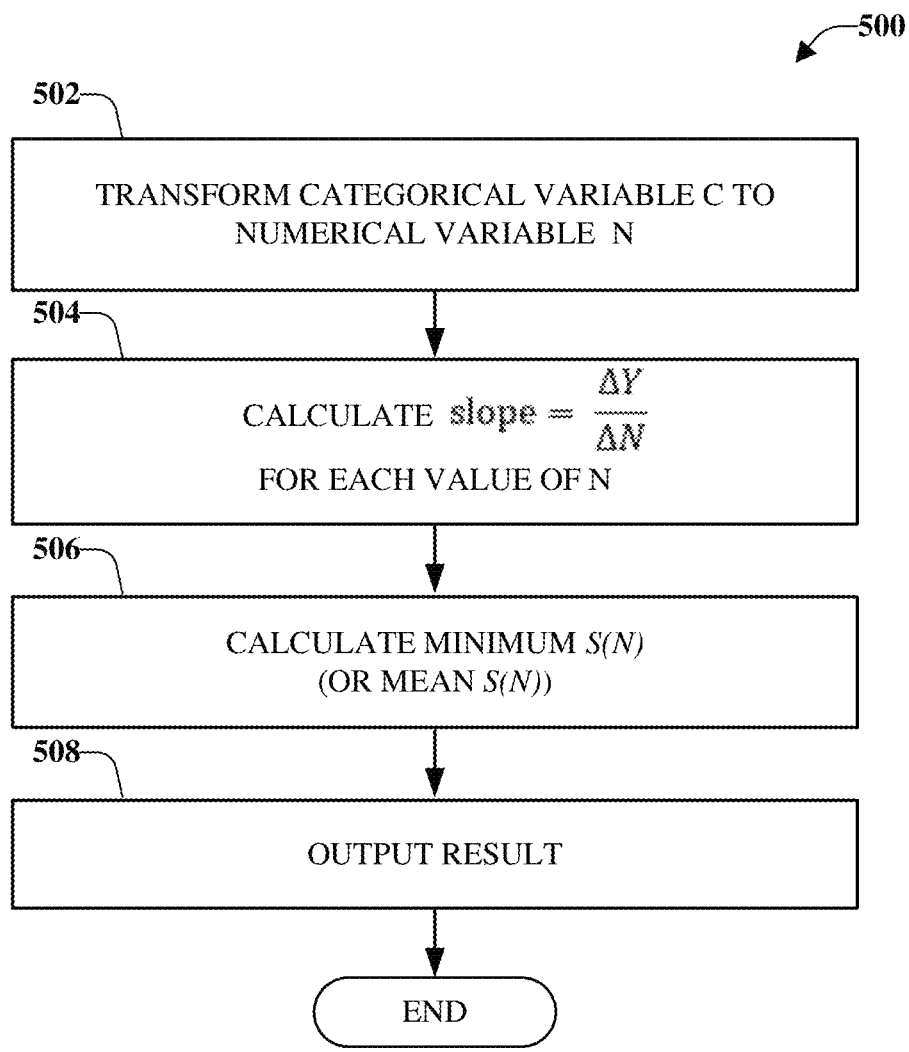
FIG. 5 illustrates an example, non-limiting, computer-implemented method for estimating categorical variable significance in accordance with one or more embodiments described herein.

FIG. 5 illustrates an example, non-limiting, computer-implemented method 500 for estimating categorical variable significance in accordance with one or more embodiments described herein. The computer-implemented method 500 can be implemented by a system including a processor, network equipment including a processor, or another computer-implemented device including a processor. Repetitive description of like elements employed in other embodiments described herein is omitted for sake of brevity.

Categorical variable C can be transformed to numerical variable N, at 502, as discussed with respect to computer-implemented method 100 of FIG. 1. After categorical variable C has been transformed to numerical variable N, which is linked to the target variable Y, the slope for each category is calculated, at 504. The slope can be calculated based on Equation 1 above.

Further, at 506 of computer-implemented method 500, the minimum S(N) is calculated (e.g., point 406 of FIG. 4). Alternatively, the mean S(N) can be calculated at 506. At 508, the result is output.

With reference again to FIG. 3, the diagram 300 depicts how mean of the target variable Ym depends on the category number. Further, the slope diagram 400 of FIG. 4 depicts how slope or derivative of the target variable Ym depends on the category number. The point 406 indicates a minimum of the dependency, which is considered as a measure of significance for categorical variable C.

According to an implementation, instead of calculation of slope based on Equation 1, derivative $$\frac{dYm}{dN}$$

can be calculated for each category number N (e.g., each point on the graph (e.g., of FIG. 3). Various processes for calculation of derivatives can be utilized with the disclosed embodiments.

If categorical variable C has a relatively small number of categories, then calculation of slopes or derivatives has relatively low accuracy. In this case, an approximation of the function Ym(N) can be calculated. Then, derivatives based on the approximation can be calculated.

Figure 6:
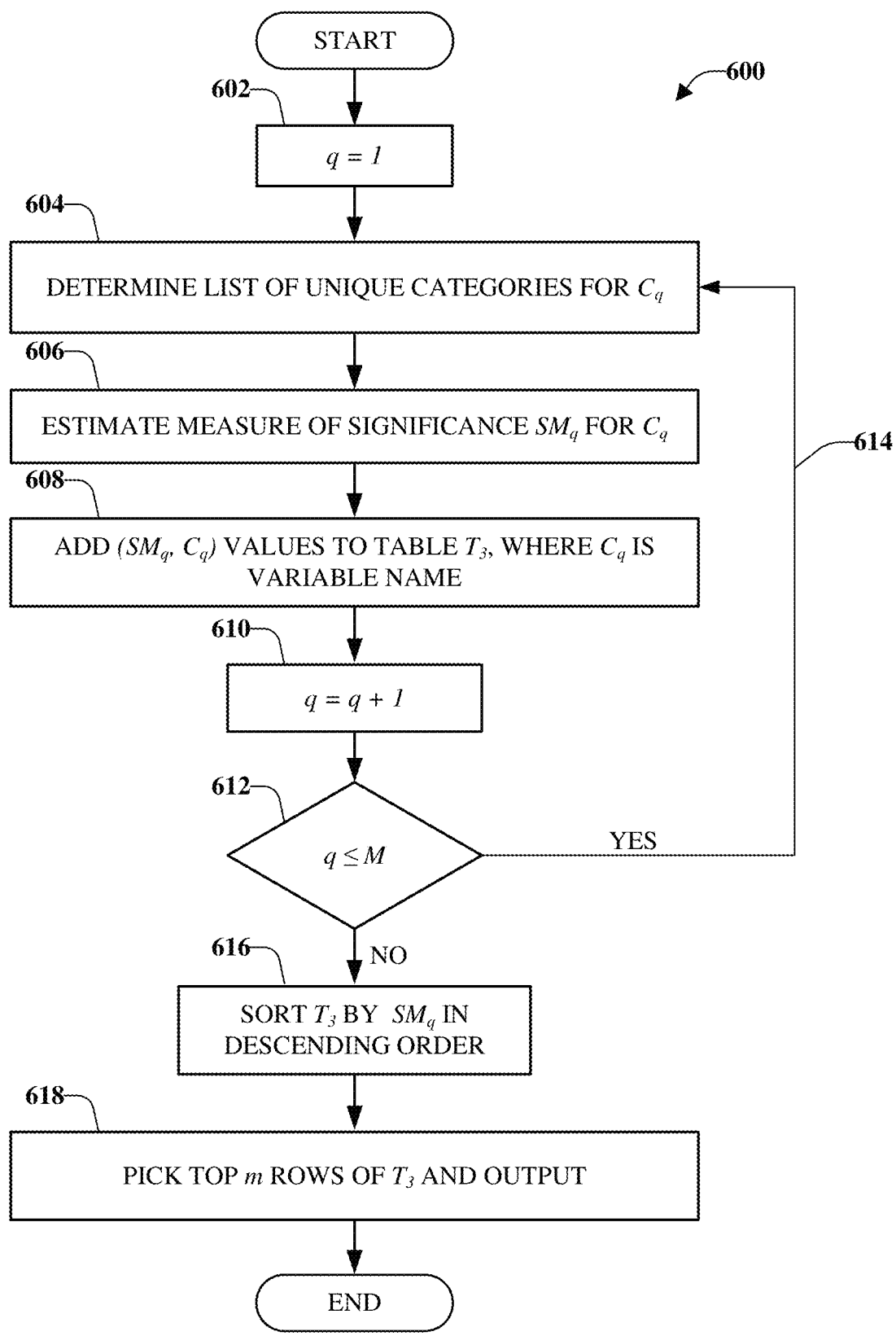
FIG. 6 illustrates an example, non-limiting, computer-implemented method for selecting categorical variables determined to be the most significant in accordance with one or more embodiments described herein.

FIG. 6 illustrates an example, non-limiting, computer-implemented method 600 for selecting categorical variables determined to be the most significant in accordance with one or more embodiments described herein. The computer-implemented method 600 can be implemented by a system including a processor, network equipment including a processor, or another computer-implemented device including a processor.

Input data can include table $T_M$, which can include M categorical features $\{C_1, C_2, \ldots, C_M\}$ and numerical target variable Y. Each categorical feature has its own number of categories. Further, the variables in table $T_M$ have K values. The computer-implemented method 600 can estimate the significance of M categorical variables (e.g., features) and choose m out of M the most significant features.

In further detail, the computer-implemented method 600 starts at 602 when q is equal to 1. At 604, a list of unique categories for $C_q$ is determined. Further, at 606, the measure of significance for $SM_q$ for $C_q$ is estimated (e.g., as discussed with respect to computer-implemented method 500). Values $(SM_q, C_q)$ are added to table $T_3$, at 608, where $C_q$ is a variable name.

At 610, q is equal to q+1. A determination is made, at 612, whether q is less than or equal to M (q≤M). If q is less than or equal to M ("YES"), the computer-implemented method 600 returns, via feedback loop 614, to 604 where another list of unique categories for Cq is determined. If the determination at 612 is that q is more than M ("NO"), at 616 $T_3$ is sorted by $SM_q$. According to some implementations, the sorting at 616 can be in descending order.

The top m rows of $T_3$ are chosen, at 618, and the result is output. According to some implementations, the output data can include a list of m names of the most significant categorical features with significance measure values $SM_q$, q=1, . . . , m; m<<M.

Figure 7:
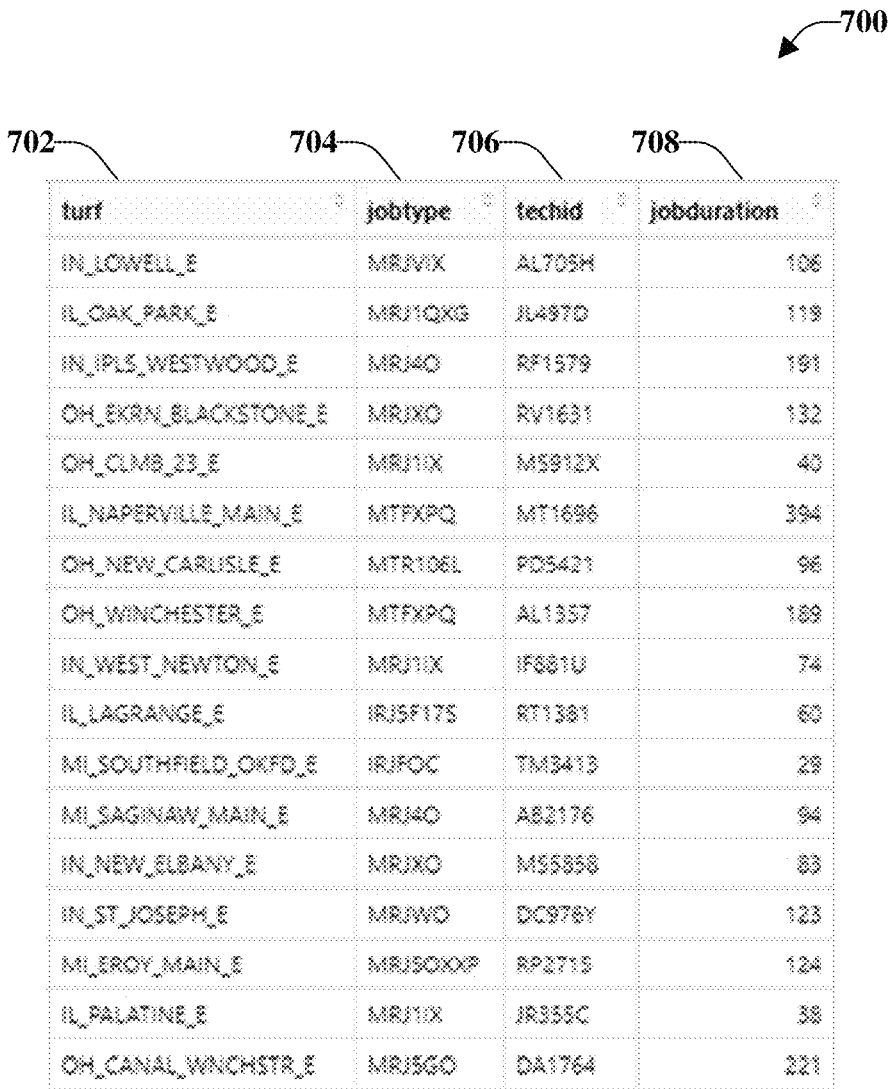
FIG. 7 illustrates an example, non-limiting, table of input data for a job durations model in accordance with one or more embodiments described herein.

FIG. 7 illustrates an example, non-limiting, table 700 of input data for a job durations model in accordance with one or more embodiments described herein. Illustrated in the columns are three categorical values (e.g., strings). Specifically, the categorical values are turf 702, a job type (jobtype 704), an identification of a technician (techid 706). Also illustrated is a target variable, which is a duration of the job (jobduration 708) that is expressed as numerical values.

A gradient booting machine (GBM) process can be used to facilitate building a model and predicting the job duration based on the categorical values (e.g., turf 702, jobtype 704, and techid 706). The significance of each categorical value should be estimated. The significance of each categorical variable can be utilized to determine answers to various questions, such as for example, which input variable impacts job duration the most and which variable has a (very) low impact and should be excluded.

Figure 8:
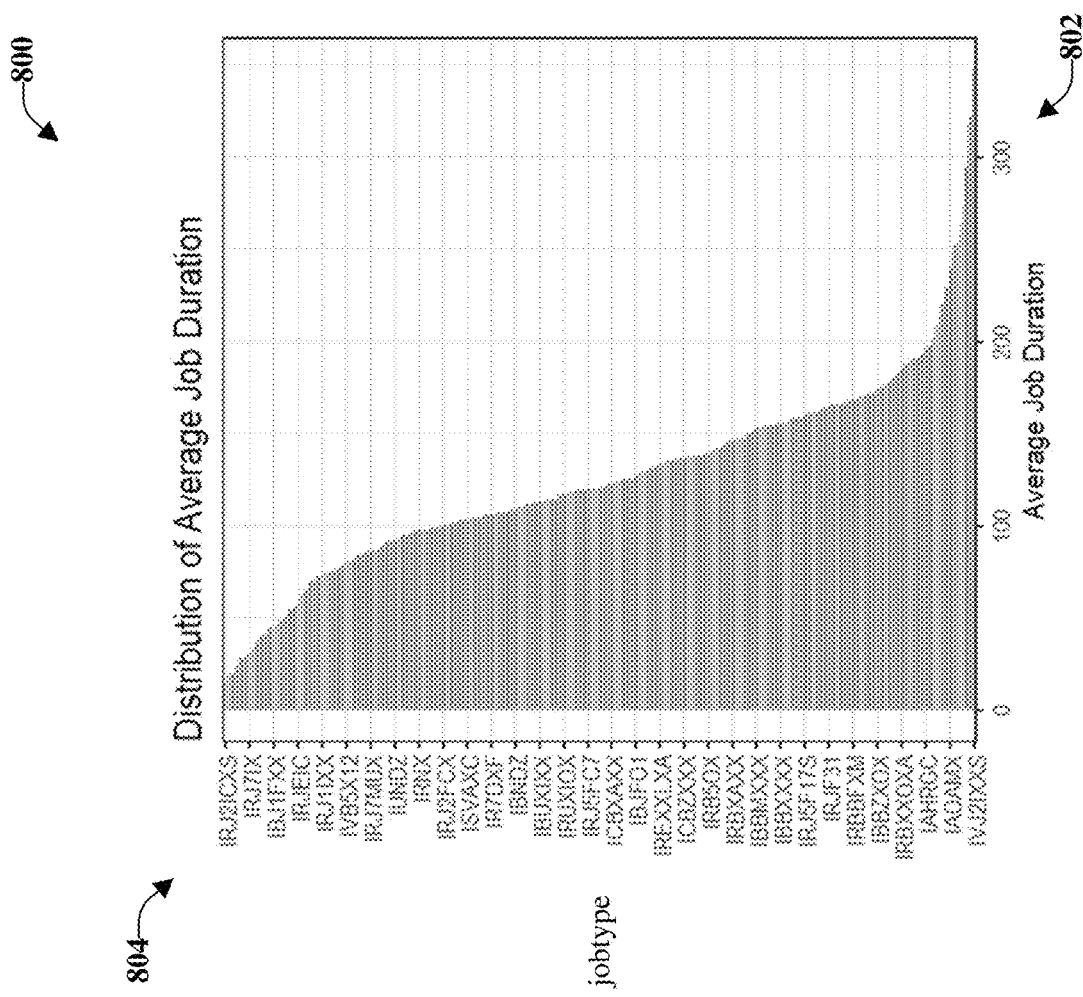
FIG. 8 illustrates an example, non-limiting, diagram of a distribution of average job duration based on job type in accordance with one or more embodiments described herein.
Figure 9:
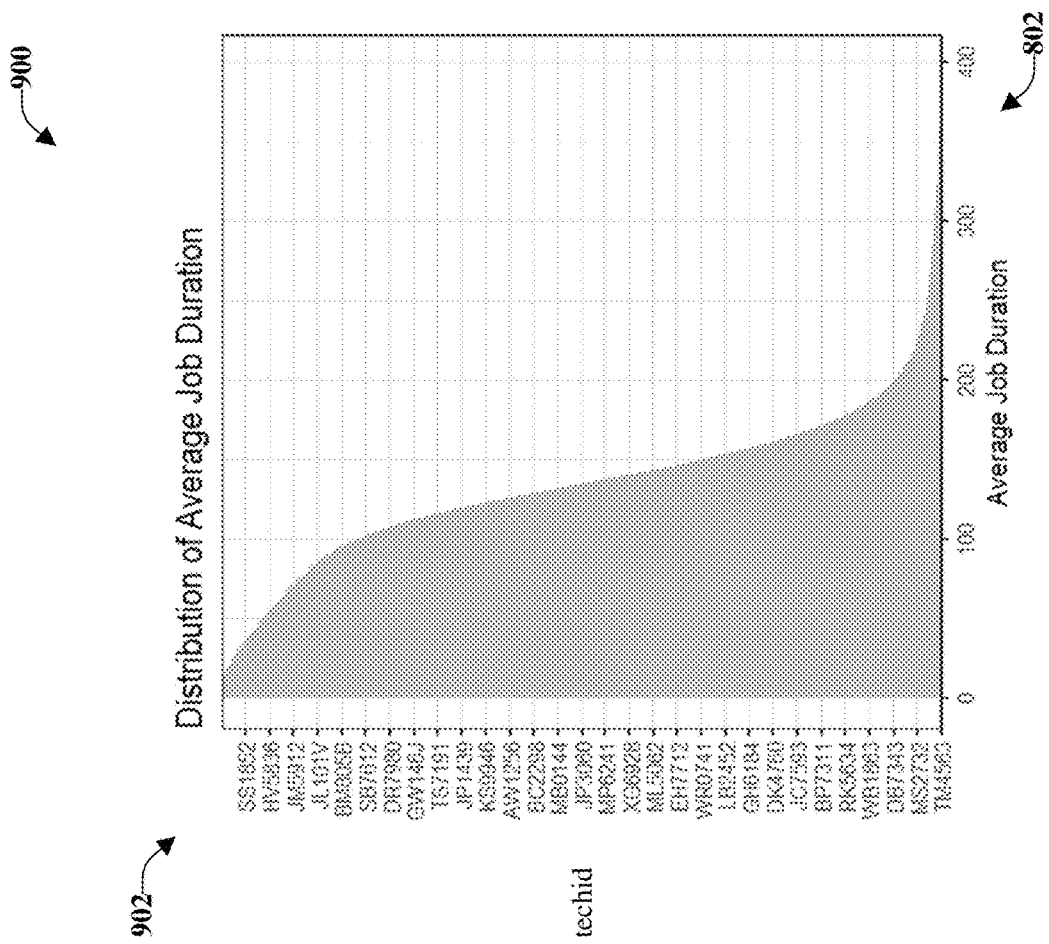
FIG. 9 illustrates an example, non-limiting, diagram of the distribution of average job duration based on technician identification in accordance with one or more embodiments described herein.
Figure 10:
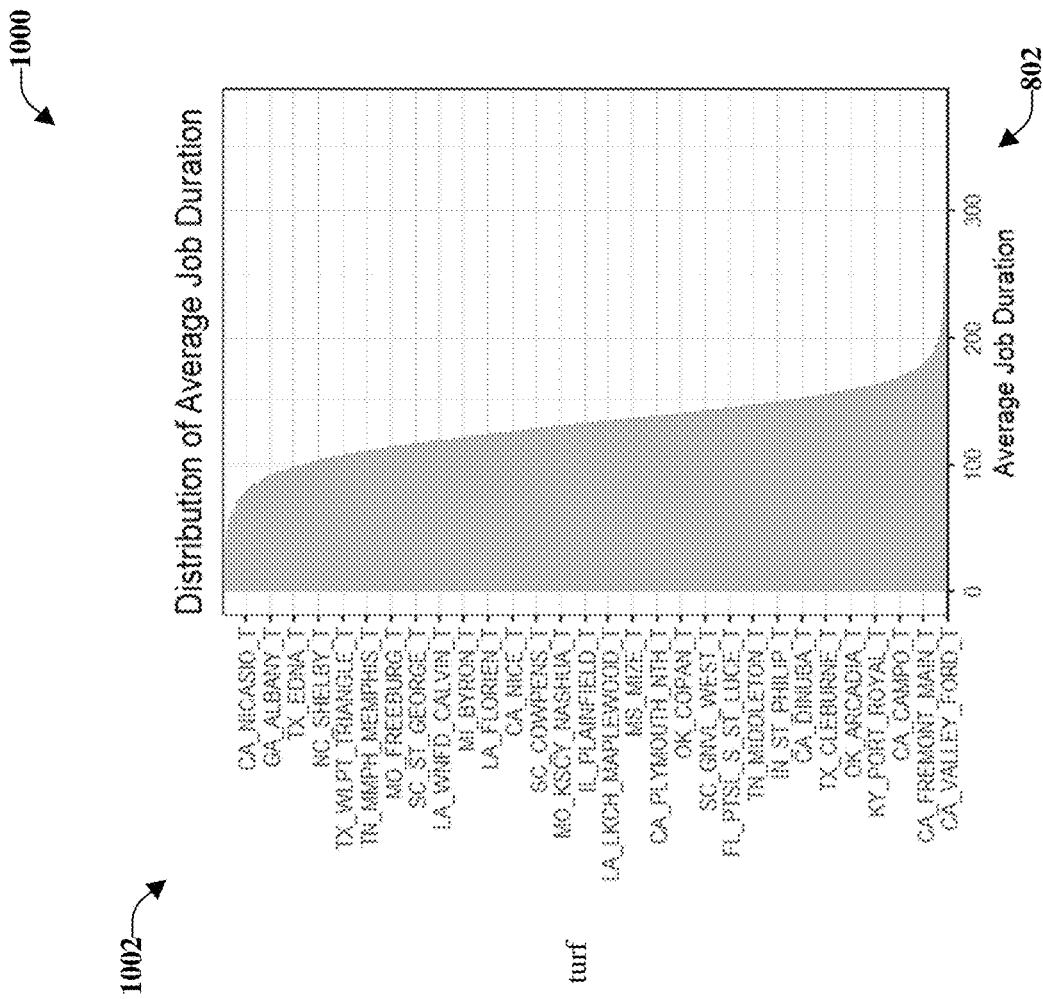
FIG. 10 illustrates an example, non-limiting, diagram of the distribution of average job duration based on turf in accordance with one or more embodiments described herein.

FIGS. 8-10 illustrate respective plots of the distribution of average job durations over categorical features. Specifically, FIG. 8 illustrates an example, non-limiting, diagram 800 of a distribution of average job duration based on job type in accordance with one or more embodiments described herein. The horizontal axis is average job duration 802 and illus-trated on the vertical axis is jobtype 804. FIG. 9 illustrates an example, non-limiting, diagram 900 of the distribution of average job duration based on technician identification in accordance with one or more embodiments described herein. Illustrated on the horizontal axis is the average job duration 802 and illustrated on the vertical axis is the identification of the technician or techid 902. FIG. 10 illustrates an example, non-limiting, diagram 1000 of the distribution of average job duration based on turf in accordance with one or more embodiments described herein. Illustrated on the horizontal axis is the average job duration 802 and illustrated on the vertical axis is the identification of the turf 1002.

Intuitively, significance of a categorical feature is proportional to slope of the curve on the diagrams of FIGS. 8-10 because the slope shows the strength of impact of the feature on the target variable. Experiments with different categorical features (the results of which are illustrated in FIGS. 8-10) demonstrate that slope mean also can be used as a reliable significance criterion. The comparison table below includes the minimum slope and mean slope for each of the categorical features of FIGS. 8-10.

| Comparison Table. | | |
|---|---|---|
| Feature | Minimum Slope | Mean Slope |
| Job Type | 0.533 | 0.806 |
| Turf | 0.0349 | 0.0945 |
| Tech ID | 0.0122 | 0.0207 |

Job Type has the biggest minimum slope and mean slope values. Therefore, job type is determined to be the most significant categorical feature. Accordingly, the disclosed embodiments facilitate the sorting of categorical features by one of significance criterion and most significant one (e.g., the one at the top of the list in the comparison table above) is selected.

Figure 11:
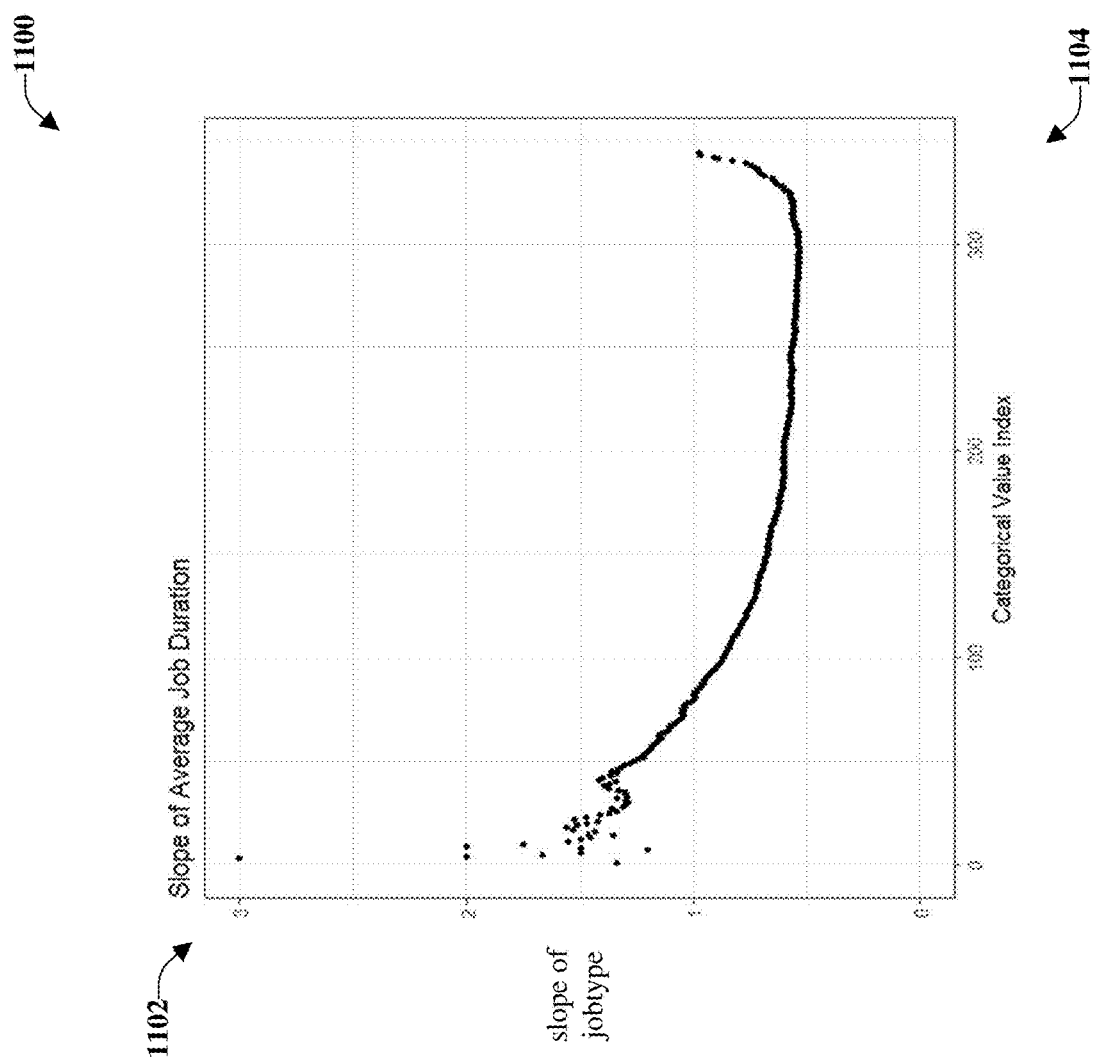
FIG. 11 illustrates an example, non-limiting, slope diagram of the diagram of FIG. 8 in accordance with one or more embodiments described herein.

FIG. 11 illustrates an example, non-limiting, slope diagram 1100 of the diagram 800 of FIG. 8 in accordance with one or more embodiments described herein. Repetitive description of like elements employed in other embodiments described herein is omitted for sake of brevity. Slope of jobtype 1102 is illustrated on the vertical axis and the categorical value index 1104 is illustrated on the horizontal axis.

Figure 12:
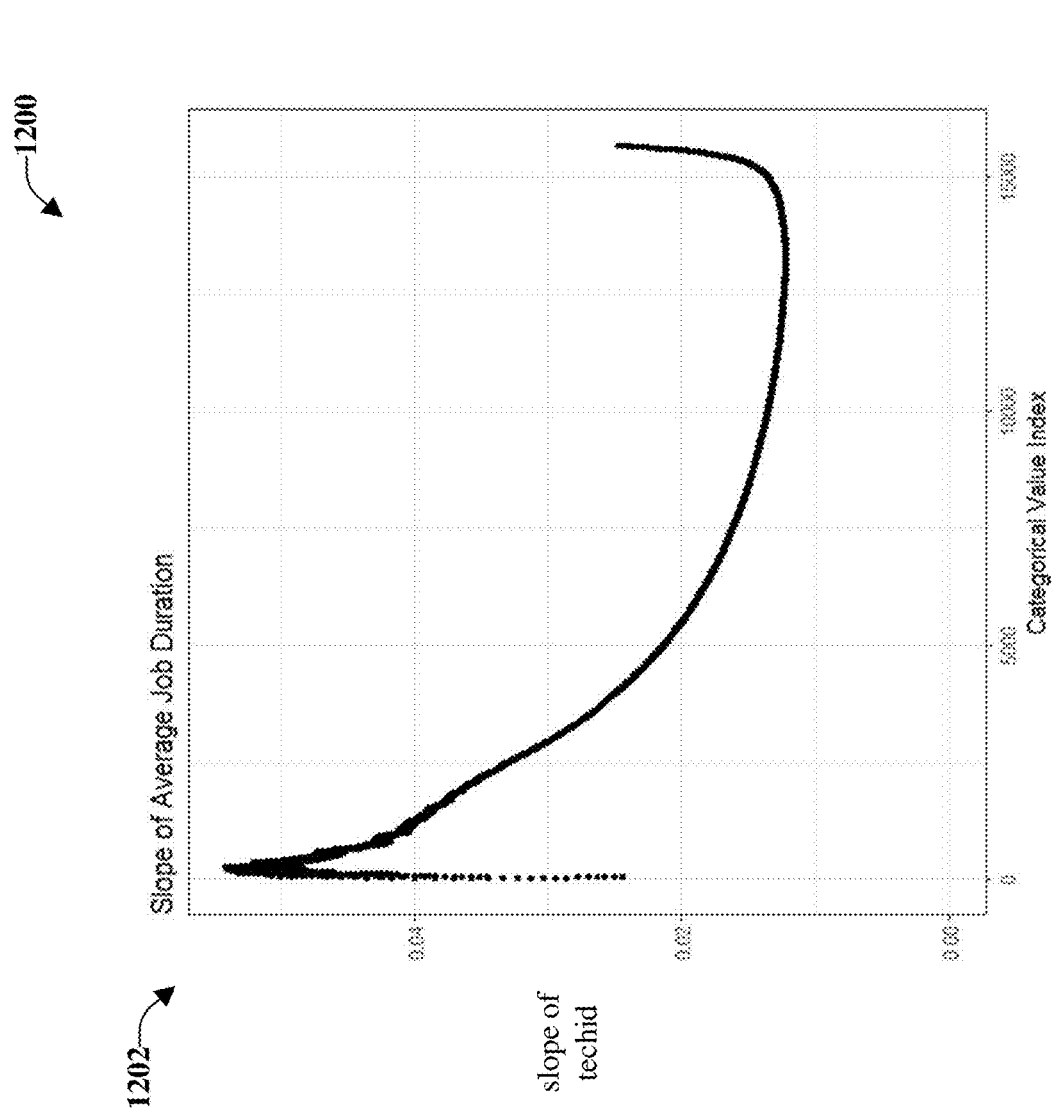
FIG. 12 illustrates an example, non-limiting, slope diagram for the slope of the technician identification of FIG. 9 in accordance with one or more embodiments described herein.

FIG. 12 illustrates an example, non-limiting, slope diagram 1200 for the slope of the techid of FIG. 9 in accordance with one or more embodiments described herein. Slope of techid 1202 is illustrated on the vertical axis and the categorical value index 1204 is illustrated on the horizontal axis.

Figure 13:
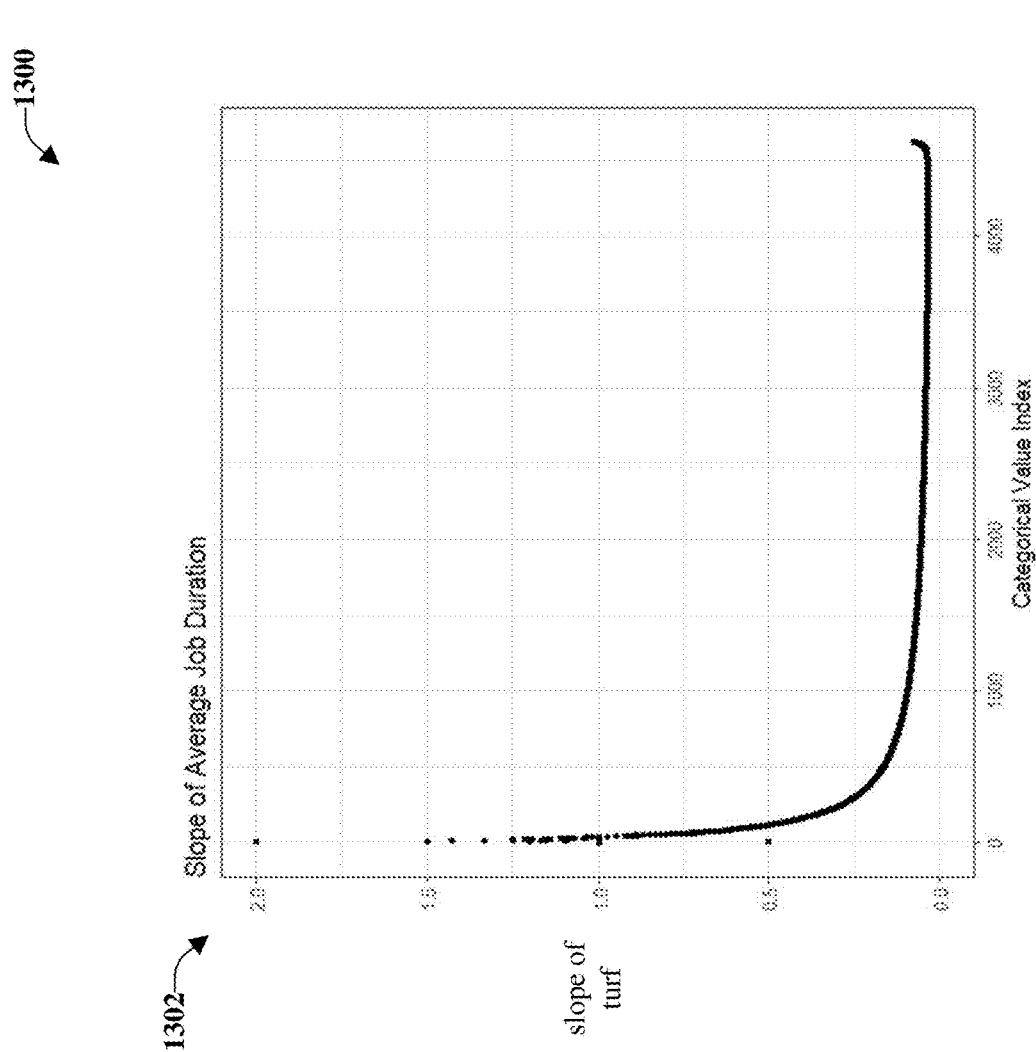
FIG. 13 illustrates an example, non-limiting, slope diagram for the slope of the turf of FIG. 10 in accordance with one or more embodiments described herein.

Further, FIG. 13 illustrates an example, non-limiting, slope diagram 1300 for the slope of the turf of FIG. 10 in accordance with one or more embodiments described herein. Slope of turf 1302 is illustrated on the vertical axis and the categorical value index 1304 is illustrated on the horizontal axis.

It is noted that, in some implementations, it is not practical to use hundreds and thousands of features to build a predictive model for various reasons. Such reasons include curse of dimensionality, Occam's Razor principle, and garbage in garbage out. As it relates to curse of dimensionality, there is overfitting. For example, if there are more columns in the data than the number of rows, the training data can be fit perfectly. However, this will not generalize to the new samples, and thus absolutely nothing is learned.

Occam's Razor principle is another reason that the input data does not include all features. The models should be simple and explainable. If all features are provided, the ability to explain is lost due to the large number of features.

For garbage in garbage out, in some implementations, there can be many non-informative features. Poor-quality input will produce poor-quality output. Also, a large number of features make a model bulky, take a large amount of time to execute, and are harder to implement in production.

Figure 14:
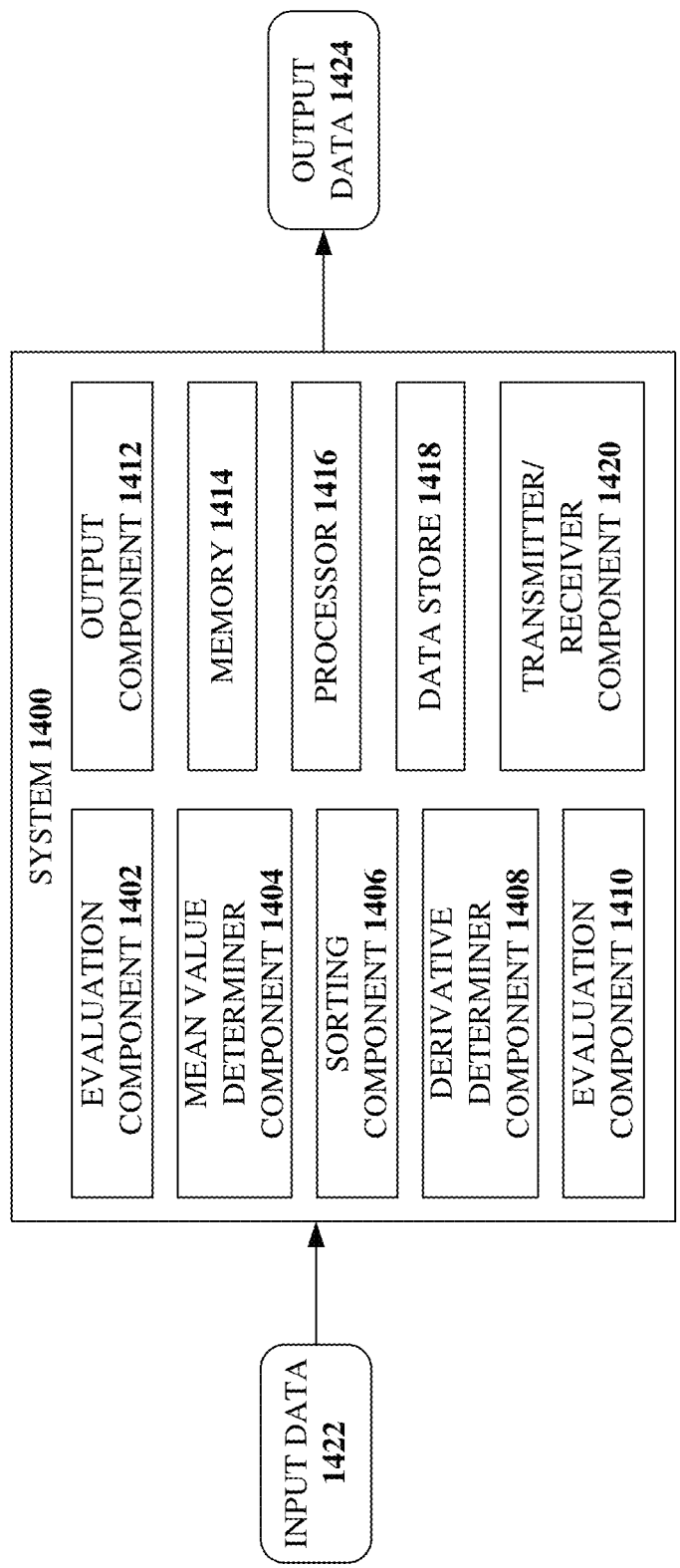
FIG. 14 illustrates an example, non-limiting, system that facilitates selection of categorical features in machine learning in accordance with one or more embodiments described herein.

FIG. 14 illustrates an example, non-limiting, system 1400 that facilitates selection of categorical features in machine learning in accordance with one or more embodiments described herein. Repetitive description of like elements employed in other embodiments described herein is omitted for sake of brevity. The system 1400 can be configured to perform functions associated with the computer-implemented method 100 of FIG. 1, the computer-implemented method 500 of FIG. 5, and/or other computer-implemented methods discussed herein.

Aspects of systems (e.g., the system 1400 and the like), apparatuses, and/or processes (e.g., computer-implemented methods) explained in this disclosure can include machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described. In various embodiments, the system 1400 can be any type of component, machine, device, facility, apparatus, and/or instrument that can include a processor and/or can be capable of effective and/or operative communication with a wired and/or wireless network.

The system 1400 can include an evaluation component 1402, a mean value determiner component 1404, a sorting component 1406, a derivative determiner component 1408, an evaluation component 1410, an output component 1412, at least one memory 1414, at least one processor 1416, at least one data store 1418, and a transmitter/receiver component 1420. In various embodiments, one or more of: the evaluation component 1402, the mean value determiner component 1404, the sorting component 1406, the derivative determiner component 1408, the evaluation component 1410, the output component 1412, the at least one memory 1414, the at least one processor 1416, the at least one data store 1418, and the transmitter/receiver component 1420 can be electrically and/or communicatively coupled to one another to perform one or more of the functions of the system 1400. In some embodiments, one or more of: the evaluation component 1402, the mean value determiner component 1404, the sorting component 1406, the derivative determiner component 1408, the evaluation component 1410, the output component 1412, and the transmitter/receiver component 1420 can include software instructions stored on the at least one memory 1414 and/or the at least one data store 1418 and executed by the at least one processor 1416. The system 1400 may also interact with other hardware and/or software components not depicted in FIG. 14.

The evaluation component 1402 can receive input data 1422 (e.g., via the transmitter/receiver component 1420). Based on the input data 1422, the evaluation component 1402 can determine a list of unique values of a categorical variable. For example, the evaluation component 1402 can extract from an input table $T_1$ (e.g., the input data 1422) all unique rows of unique values of a categorical variable C.

In further detail, the input data 1422 can include information indicative of values associated with respective categories of various categorical variables. Categorical variables can have values that are names or labels. For example, for a color of a ball, categorical variables can be orange, brown, green, black and white, red, blue, green, and so on. In another example, for a type of ball, the categorical variables can be beachball, a soccer ball, a football, a baseball, golf ball, volleyball, billiard ball, and so on. The input data 1422 can include thousands of categorical variables. In some implementations, the input data 1422 can include a single target numerical variable for which a predictive model is to be built based on the categorical variables. With reference to the examples of FIGS. 7-13, the categorical variables can be jobtype, techid, and turf, and the single target numerical variable can be the average job duration.

In another non-limiting example where the categorical variable is technician identification (techid), the categories can be the information related to the different technician identifications as indicated by the rows on the vertical axis of FIG. 9. In a further, non-limiting example where the categorical variable is the turf, the categories can be the information related to the different turfs as indicated by the rows on the vertical axis of FIG. 10.

With respect to the jobtype of FIG. 8, the first average of first values can be an average associated with the job type "IRJ2ICXS." For example, first values of this job type can be different amounts of time spend to complete that job over a defined period of time (e.g., days, weeks, months, years, and so on). Thus, the first values for job type "IRJ2ICXS" can be averaged to derive a single value (e.g., a first average). Further, second values for job type "IRJ71X" of FIG. 8 can be averaged to determine an average duration of time to complete job type "IRJ71X" (e.g., resulting in a second average). This averaging can be performed for each job type (e.g., the subsequent job types identified), resulting in respective subsequent averages.

The mean value determiner component 1404 can determine (e.g., calculate) respective mean values of a target variable for unique values of the list of unique values of the categorical variable. According to an implementation, the mean value determiner component 1404 can determine average values $Y_{mj}=\text{mean}(Y_j)$ for all extracted values of a target variable Y. In an example, the respective mean values can be a quadratic mean value, an arithmetic mean value, a geometric mean value, a weighted arithmetic mean value, and/or a weighted arithmetic mean value.

The sorting component 1406 can sort the list of unique values by the respective mean values, resulting in a sorted list. For example, the sorting component 1406 can sort a second table $T_2$ by variable Ym, which includes k mean values for each category.

According to some implementations, the sorting by the sorting component 1406 can be a descending order of the unique values. However, the disclosed aspects are not limited to a descending order and other defined orders can be utilized (e.g., ascending order, and so on). With reference again to FIG. 8, the unique values can be sorted in the defined order and the labels (e.g., "IRJ2ICXS," "IRJ71X," and so on) can be replaced with numbers, such as 1, 2, 3, 4, and so on.

The derivative determiner component 1408 can determine (e.g., calculate) respective derivatives of the mean values in the sorted list. To determine the respective derivatives, the derivative determiner component 1408 can consider the mean values as a function and a number of a mean value in the sorted list as an independent variable. According to an example, the derivative determiner component 1408 can calculate the respective derivatives as a slope based on determining a ratio of the mean values change to an item number change between any two items on the list.

The evaluation component 1410 can determine a minimum derivative value over the sorted list. In an example, the minimum derivative value can be a mean of all slope values in the table, which is depicted by the point 406 (e.g., slope minimum). According to some implementations, a resulting variable significance value can be determined (e.g., calculated) as a mean of derivative.

The output component 1412 can output (e.g., via the transmitter/receiver component 1420) the minimum derivative value as the resulting variable significance value as output data 1424. The output data 1424 can be utilized to create one or more predictive models, to automatically implement one or more actions to approximate the target variable or to impact the target variable, or to perform other actions with respect to the target variable.

The at least one memory 1414 can be operatively connected to the at least one processor 1416. The at least one memory 1414 and/or the at least one data store 1418 can store executable instructions that, when executed by the at least one processor 1416 can facilitate performance of operations. Further, the at least one processor 1416 can be utilized to execute computer executable components stored in the at least one memory 1414 and/or the at least one data store 1418.

For example, the at least one memory 1414 can store protocols associated with evaluating, transforming, mapping, analyzing, comparing, implementing, and outputting data as discussed herein. Further, the at least one memory 1414 can facilitate action to control communication between the system 1400, other apparatuses, other systems, network equipment, and/or user equipment associated with the categories under consideration, and so on, such that the system 1400 can employ stored protocols and/or processes to facilitate selection of the most significant set of categorical features in machine learning as described herein.

It should be appreciated that data stores (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically Programmable ROM (EPROM), Electrically Erasable ROM (EEPROM), or flash memory. Volatile memory can include Random Access Memory (RAM), which acts as external cache memory. By way of example and not limitation, RAM is available in many forms such as Synchronous RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DRRAM). Memory of the disclosed aspects are intended to include, without being limited to, these and other suitable types of memory.

The at least one processor 1416 can facilitate respective analysis of information related to one or more categories to be utilized to build machine learning models. The at least one processor 1416 can be a processor dedicated to analyzing and/or generating information received, a processor that controls one or more components of the system 1400, and/or a processor that both analyzes and generates information received and controls one or more components of the system 1400.

Figure 15:
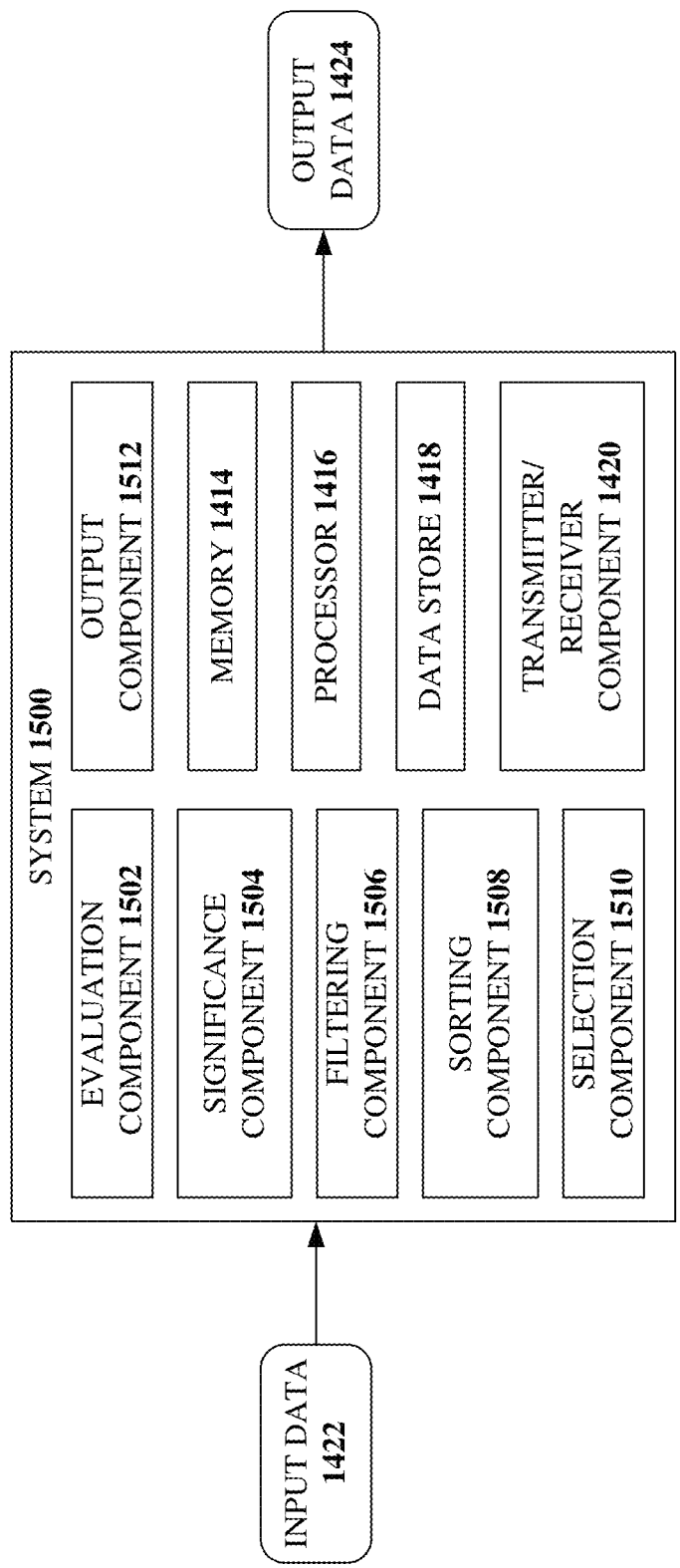
FIG. 15 illustrates another example, non-limiting, system that facilitates selection of categorical features in machine learning in accordance with one or more embodiments described herein.

FIG. 15 illustrates another example, non-limiting, system 1500 that facilitates selection of categorical features in machine learning in accordance with one or more embodiments described herein. Repetitive description of like elements employed in other embodiments described herein is omitted for sake of brevity. The system 1500 can be configured to perform functions associated with the computer-implemented method 600 of FIG. 6, the computer-implemented method 100 of FIG. 1, the computer-implemented method 500 of FIG. 5, and/or other computer-implemented methods discussed herein. Further, the system 1500 of FIG. 15 can perform one or more functionalities of the system 1400 of FIG. 14, and vice versa.

The system 1500 can include an evaluation component 1502, a significance component 1504, a filter component 1506, a sorting component 1508, a selection component 1510, an output component 1512, the at least one memory 1414, the at least one processor 1416, the least one data store 1418, and the transmitter/receiver component 1420. In various embodiments, one or more of: the evaluation component 1502, the significance component 1504, the filter component 1506, the sorting component 1508, the selection component 1510, the output component 1512, the at least one memory 1414, the at least one processor 1416, the at least one data store 1418, and the transmitter/receiver component 1420 can be electrically and/or communicatively coupled to one another to perform one or more of the functions of the system 1500. In some embodiments, one or more of: the evaluation component 1502, the significance component 1504, the filter component 1506, the sorting component 1508, the selection component 1510, the output component 1512, and the transmitter/receiver component 1420 can include software instructions stored on the at least one memory 1414 and/or the at least one data store 1418 and executed by the at least one processor 1416. The system 1500 may also interact with other hardware and/or software components not depicted in FIG. 15.

The evaluation component 1502 can receive the input data 1422 and can determine a list of categorical variables based on the input data 1422. For example, the evaluation component 1502 can determine a list of unique categories for $C_q$.

The significance component 1504 can estimate respective significances of categorical variables of the list of categorical variables. For example, the measure of significance for $SM_q$ for $C_q$ is estimated. According to some implementations, the significance component 1504 can be configured to perform at least a portion of the functionalities of system 1400 in order to estimate the respective significances.

Further, the filter component 1506 can filter categorical variables with a significance value that satisfies a threshold value. For example, the filter component 1506 can determine whether q is less than or equal to M (q≤M).

The sorting component 1508 can sort the categorical variables by respective significance values in descending order. For example, the sorting component 1508 can sort a third table T3 by $SM_q$. Although discussed with respect to descending order, an ascending order can be utilized in accordance with some implementations.

The selection component 1510 can select a defined number of variables of the categorical variables. Thus, the selection component 1510 can select the categorical variables including a biggest significance value. The selection by the selection component 1510 results in a determined list of the most significant categorical variables. For example, the top m rows of $T_3$ are chosen.

The output component 1512 can output a resulting list as the most significant variables as the output data 1424. For example, the output data 1424 can include a list of m names of the most significant categorical features with significance measure values $SM_q$, q=1, ..., m; m<<M. The output data 1424 can be utilized to create one or more predictive models, to automatically implement one or more actions to approximate the target variable or to impact the target variable, or to perform other actions with respect to the target variable.

As discussed, provided herein are approaches to transform categorical variables to numerical variables and to estimate significance criterion. Existing features selection approaches can be used for categorical variables but are lacking in various areas. Such existing feature selection approaches include Chi-square and recursive feature elimination.

The Chi-square test is used for categorical features in a dataset. Chi-square is calculated between each feature and the target and the desired number of features with the best Chi-square scores being selected. In order to correctly apply the chi-square, the following conditions should be met: the variables should be categorical, sampled independently, values should have an expected frequency greater than 5, and the number of categories should be less than 20. In real life problems, however, there are frequencies from 1 to thousands for the same categorical variable, and the number of categories can exceed hundreds and thousands. In other words, each of the recommended conditions is violated, which can lead to errors in conclusions.

For the recursive feature elimination, consider the selection of a set of features as a search problem. The goal of recursive feature elimination (RFE) is to select features by recursively considering smaller and smaller sets of features. First, the estimator is trained on the initial set of features and the importance of each feature is obtained through a feature importance attribute of a machine learning process. Then, the least important features are pruned from current set of features. That procedure is recursively repeated on the pruned set until the desired number of features to select is eventually reached. The recursive feature elimination approach can be used for categorical features, but it is very resource consuming with large datasets and large initial number of features. Also, hidden within machine learning processes mechanism of feature selection is empirical, not scientific, and the method used cannot be determined.

Thus, there are no existing straightforward and reliable feature selection processes. The disclosed embodiments provide a simple and reliable, scientific process of feature selection.

More specifically, the disclosed embodiments provide an approach to transform categorical variable to numerical variable. With the disclosed embodiments, the feature selection process transforms categorical variable C to a numerical variable N based on mean of target variable Y values, and sorting by target mean values. Values of the original variable C have a one-to-many relationship with target variable Y values, which makes analysis much more complicated. In contrast, values of variable N have a one-to-one relationship with transformed target variable Ym values. Further, sorting by target mean Ym values is an important part of transforming C to N because it makes the dependency Ym=f(N) smooth and monotonic, which allow for the calculation of slope with high accuracy.

Further, the disclosed embodiments provide an approach to estimate significance criterion. For example, calculate $$\text{slope } S = \frac{dYm}{dN}$$

for each N value, and use of minimum and/or mean of the function S=S(N) as criterion of significance, as discussed herein.

Described herein are systems, methods, articles of manufacture, non-transitory machine-readable medium, and other embodiments or implementations that can facilitate selection of the most significant set of categorical features in machine learning. For example, the disclosed feature selection process (a) transforms categorical variable C to a numerical variable N based on means of the target variable values for each category, and (b) sorts by the target mean values. Then, (c) slope is calculated for each row in the dataset, and (d) minimum and/or mean of the slope column in the transformed table is determined. Subset of K features with highest minimum value and/or mean value are the most significant features, which can be used to build machine learning models.

Accordingly, the disclosed embodiments provide a way of transforming categorical feature C to a numerical variable N, and of calculating slope S for each point of N and finding minimum(S) and mean(S) as measures of significance for the feature C.

Feature selection is a step that can be implemented before model building in machine learning technology, which impacts accuracy and interpretability of models. Machine learning is used in a majority of industries by data science community and the disclosed embodiments provide simplicity and accuracy of the approach as discussed herein.

As mentioned above, there are no existing straightforward and reliable feature selection processes. The disclosed embodiments provide a simple and reliable, scientific process of feature selection. Further, the disclosed embodiments have several advantages over existing feature selection processes. For example, the disclosed embodiments do not make any assumptions on independence of categorical variables and frequency of categories because statistical distributions are not involved in the significance estimation, only categorical feature and target variable are taken in account. Also, the disclosed embodiments do not use heuristic approaches such as recursive feature elimination, which is based on building machine learning models on each iteration with different sets of features.

Additionally, the disclosed embodiments convert categorical feature C to a numerical variable N in such a way that N contains information about dependency between C and target variable T and makes the dependency smooth and monotonic. After that, slope S is calculated for each point of the vector N. Minimum(S) and mean(S) are equally good measures of significance for the categorical feature C. The idea is intuitive, easy for understanding and implementation. The manner of converting C to N, as discussed herein, can guarantee monotone dependency and accurate calculation of slope, which makes the process reliable. The simplicity of the calculations can guarantee quick results even for huge data volumes.

Additionally, the disclosed embodiments provide practical means for categorical feature selection for any machine learning problems involving categorical features. The disclosed embodiments allow building more accurate and more interpretable models, which improves overall quality of data science projects. More accurate predictions allow improvement to business efficiency in all aspects of business based on machine learning models prediction.

As discussed herein provided is a method that includes determining, by a system comprising a processor, a list of unique values of a categorical variable. The method also includes calculating, by the system, mean value of the target variable for each unique value of the categorical variable. The list of unique categorical values is sorted by the mean values. Further, the method includes calculating, by the system, derivative at each item in the list of the mean values considering the mean values as a function and the number of a mean value in the list as an independent variable. The method also includes determining, by the system, minimum derivative value over the list and outputting it as resulting variable significance value.

Figure 16:
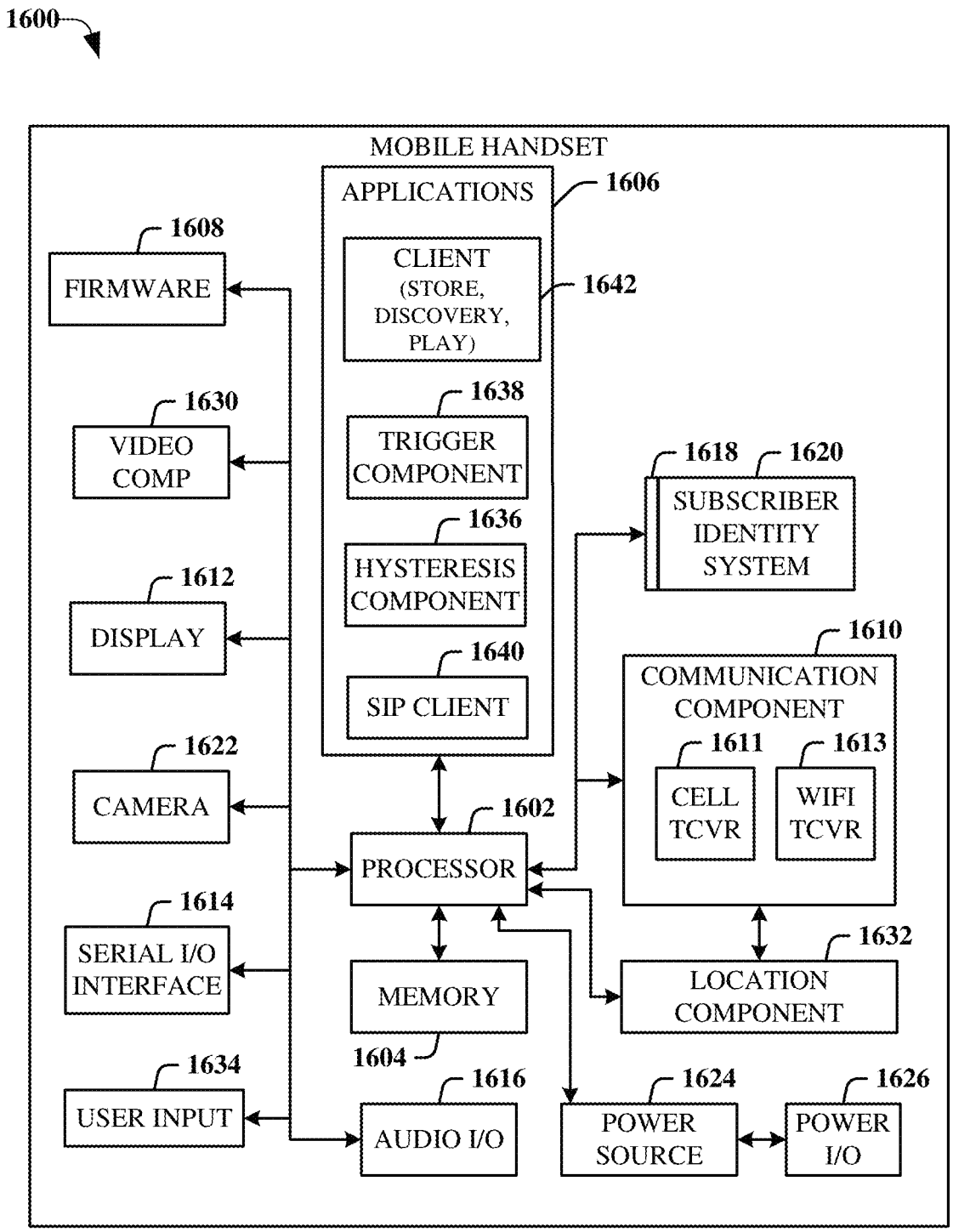
FIG. 16 illustrates an example, non-limiting, block diagram of a handset operable to engage in a system architecture that facilitates wireless communications according to one or more embodiments described herein.

In another example, provided is a method that includes determining, by a system comprising a processor, a list of categorical variables and estimating, by the system, significance of each categorical variable in the list by the method discussed in the above paragraph. Further, the method includes filtering, by the system, categorical variables with significance value bigger than a threshold and output it as a resulting list of the most significant variables. In an example, categorical variables are sorted by significance value in descending order and certain number of top variables with biggest significance values are selected and a resulting list of the most significant categorical variables Referring now to FIG. 16, illustrated is an example, non-limiting, block diagram of a handset 1600 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information, and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 1602 for controlling and processing all onboard operations and functions. A memory 1604 interfaces to the processor 1602 for storage of data and one or more applications 1606 (e.g., a video player software, user feedback component software, etc.). Other applications can include voice recognition of predetermined voice commands that facilitate initiation of the user feedback signals. The applications 1606 can be stored in the memory 1604 and/or in a firmware 1608, and executed by the processor 1602 from either or both the memory 1604 or/and the firmware 1608. The firmware 1608 can also store startup code for execution in initializing the handset 1600. A communications component 1610 interfaces to the processor 1602 to facilitate wired/wireless communication with external systems, e.g., cellular networks, VoIP networks, and so on. Here, the communications component 1610 can also include a suitable cellular transceiver 1611 (e.g., a GSM transceiver) and/or an unlicensed transceiver 1613 (e.g., Wi-Fi, WiMax) for corresponding signal communications. The handset 1600 can be a device such as a cellular telephone, a PDA with mobile communications capabilities, and messaging-centric devices. The communications component 1610 also facilitates communications reception from terrestrial radio networks (e.g., broadcast), digital satellite radio networks, and Internet-based radio services networks.

The handset 1600 includes a display 1612 for displaying text, images, video, telephony functions (e.g., a Caller ID function), setup functions, and for user input. For example, the display 1612 can also be referred to as a "screen" that can accommodate the presentation of multimedia content (e.g., music metadata, messages, wallpaper, graphics, etc.). The display 1612 can also display videos and can facilitate the generation, editing and sharing of video quotes. A serial I/O interface 1614 is provided in communication with the processor 1602 to facilitate wired and/or wireless serial communications (e.g., USB, and/or IEEE 1394) through a hardwire connection, and other serial input devices (e.g., a keyboard, keypad, and mouse). This can support updating and troubleshooting the handset 1600, for example. Audio capabilities are provided with an audio I/O component 1616, which can include a speaker for the output of audio signals related to, for example, indication that the user pressed the proper key or key combination to initiate the user feedback signal. The audio I/O component 1616 also facilitates the input of audio signals through a microphone to record data and/or telephony voice data, and for inputting voice signals for telephone conversations.

The handset 1600 can include a slot interface 1618 for accommodating a SIC (Subscriber Identity Component) in the form factor of a card Subscriber Identity Module (SIM) or universal SIM 1620, and interfacing the SIM card 1620 with the processor 1602. However, it is to be appreciated that the SIM card 1620 can be manufactured into the handset 1600, and updated by downloading data and software.

The handset 1600 can process IP data traffic through the communications component 1610 to accommodate IP traffic from an IP network such as, for example, the Internet, a corporate intranet, a home network, a person area network, etc., through an ISP or broadband cable provider. Thus, VoIP traffic can be utilized by the handset 1600 and IP-based multimedia content can be received in either an encoded or decoded format.

A video processing component 1622 (e.g., a camera) can be provided for decoding encoded multimedia content. The video processing component 1622 can aid in facilitating the generation, editing, and sharing of video quotes. The handset 1600 also includes a power source 1624 in the form of batteries and/or an AC power subsystem, which power source 1624 can interface to an external power system or charging equipment (not shown) by a power I/O component 1626.

The handset 1600 can also include a video component 1630 for processing video content received and, for recording and transmitting video content. For example, the video component 1630 can facilitate the generation, editing and sharing of video quotes. A location tracking component 1632 facilitates geographically locating the handset 1600. As described hereinabove, this can occur when the user initiates the feedback signal automatically or manually. A user input component 1634 facilitates the user initiating the quality feedback signal. The user input component 1634 can also facilitate the generation, editing and sharing of video quotes. The user input component 1634 can include such conventional input device technologies such as a keypad, keyboard, mouse, stylus pen, and/or touchscreen, for example.

Referring again to the applications 1606, a hysteresis component 1636 facilitates the analysis and processing of hysteresis data, which is utilized to determine when to associate with the access point. A software trigger component 1638 can be provided that facilitates triggering of the hysteresis component 1636 when the Wi-Fi transceiver 1613 detects the beacon of the access point. A SIP client 1640 enables the handset 1600 to support SIP protocols and register the subscriber with the SIP registrar server. The applications 1606 can also include a client 1642 that provides at least the capability of discovery, play and store of multimedia content, for example, music.

The handset 1600, as indicated above related to the communications component 1610, includes an indoor network radio transceiver 1613 (e.g., Wi-Fi transceiver). This function supports the indoor radio link, such as IEEE 802.11, for a dual-mode GSM handset. The handset 1600 can accommodate at least satellite radio services through a handset that can combine wireless voice and digital radio chipsets into a single handheld device.

Figure 17:
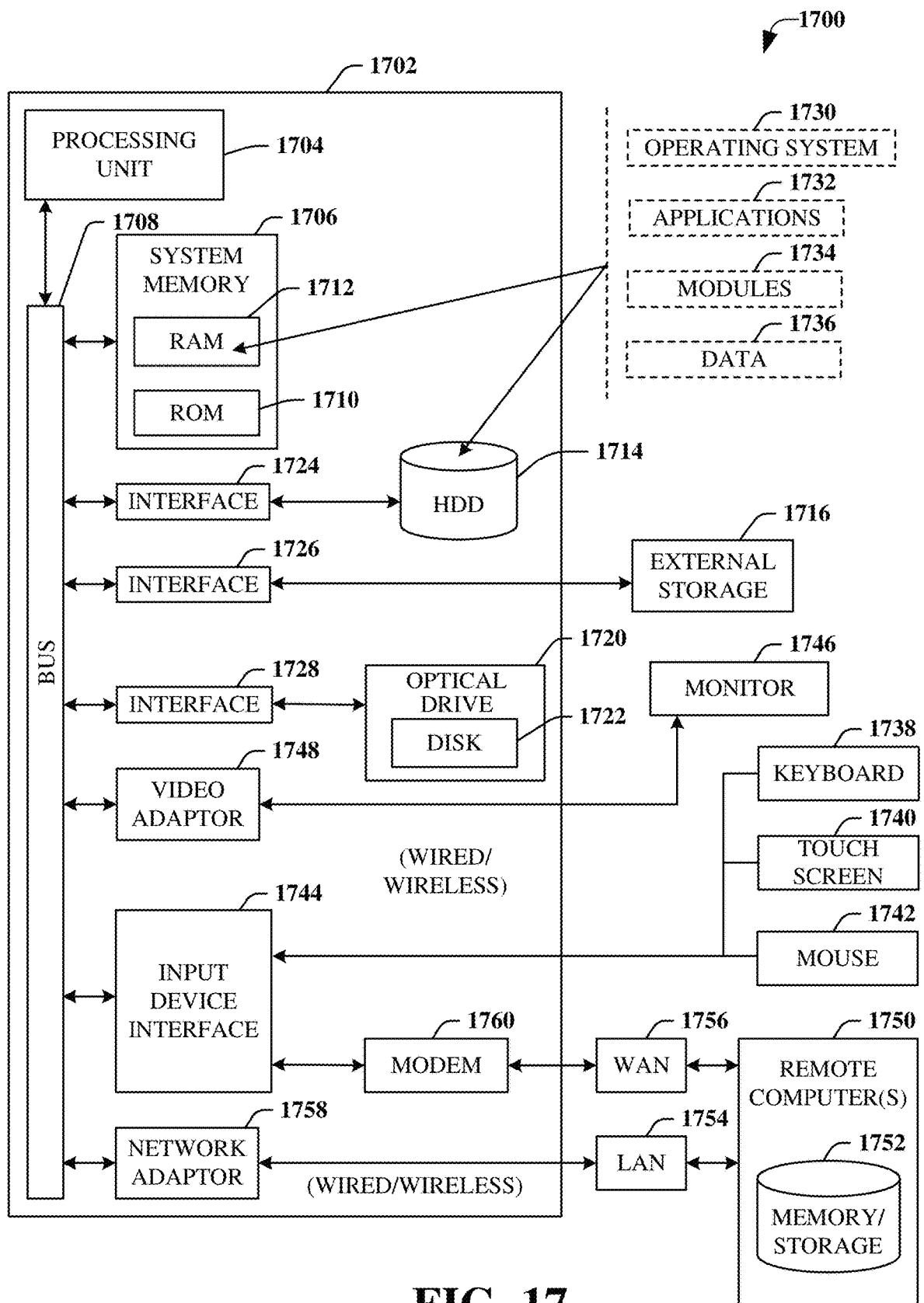
FIG. 17 illustrates an example, non-limiting, block diagram of a computer operable to engage in a system architecture that facilitates wireless communications according to one or more embodiments described herein.

In order to provide additional context for various embodiments described herein, FIG. 17 and the following discussion are intended to provide a brief, general description of a suitable computing environment 1700 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 17, the example environment 1700 for implementing various embodiments of the aspects described herein includes a computer 1702, the computer 1702 including a processing unit 1704, a system memory 1706 and a system bus 1708. The system bus 1708 couples system components including, but not limited to, the system memory 1706 to the processing unit 1704. The processing unit 1704 can be any of various commercially available processors. Dual microprocessors and other multi-processor architectures can also be employed as the processing unit 1704.

The system bus 1708 can be any of several types of bus structure that can further interconnect to a memory bus (with or without a memory controller), a peripheral bus, and a local bus using any of a variety of commercially available bus architectures. The system memory 1706 includes ROM 1710 and RAM 1712. A Basic Input/Output System (BIOS) can be stored in a non-volatile memory such as ROM, erasable programmable read only memory (EPROM), EEPROM, which BIOS contains the basic routines that help to transfer information between elements within the computer 1702, such as during startup. The RAM 1712 can also include a high-speed RAM such as static RAM for caching data.

The computer 1702 further includes an internal hard disk drive (HDD) 1714 (e.g., EIDE, SATA), one or more external storage devices 1716 (e.g., a magnetic floppy disk drive (FDD) 1716, a memory stick or flash drive reader, a memory card reader, etc.) and a drive 1720, e.g., such as a solid state drive, an optical disk drive, which can read or write from a disk 1722, such as a CD-ROM disc, a DVD, a BD, etc. Alternatively, where a solid state drive is involved, disk 1722 would not be included, unless separate. While the internal HDD 1714 is illustrated as located within the computer 1702, the internal HDD 1714 can also be configured for external use in a suitable chassis (not shown). Additionally, while not shown in environment 1700, a solid state drive (SSD) could be used in addition to, or in place of, an HDD 1714. The HDD 1714, external storage device(s) 1716 and drive 1720 can be connected to the system bus 1708 by an HDD interface 1724, an external storage interface 1726 and a drive interface 1728, respectively. The interface 1724 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1702, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1712, including an operating system 1730, one or more application programs 1732, other program modules 1734 and program data 1736. All or portions of the operating system, applications, modules, and/or data can also be cached in the RAM 1712. The systems and methods described herein can be implemented utilizing various commercially available operating systems or combinations of operating systems.

Computer 1702 can optionally include emulation technologies. For example, a hypervisor (not shown) or other intermediary can emulate a hardware environment for operating system 1730, and the emulated hardware can optionally be different from the hardware illustrated in FIG. 17. In such an embodiment, operating system 1730 can include one virtual machine (VM) of multiple VMs hosted at computer 1702. Furthermore, operating system 1730 can provide runtime environments, such as the Java runtime environment or the .NET framework, for applications 1732. Runtime environments are consistent execution environments that allow applications 1732 to run on any operating system that includes the runtime environment. Similarly, operating system 1730 can support containers, and applications 1732 can be in the form of containers, which are lightweight, standalone, executable packages of software that include, e.g., code, runtime, system tools, system libraries and settings for an application.

Further, computer 1702 can be enable with a security module, such as a trusted processing module (TPM). For example, with a TPM, boot components hash next in time boot components, and wait for a match of results to secured values, before loading a next boot component. This process can take place at any layer in the code execution stack of computer 1702, e.g., applied at the application execution level or at the operating system (OS) kernel level, thereby enabling security at any level of code execution.

A user can enter commands and information into the computer 1702 through one or more wired/wireless input devices, e.g., a keyboard 1738, a touch screen 1740, and a pointing device, such as a mouse 1742. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1704 through an input device interface 1744 that can be coupled to the system bus 1708, but can be connected by other interfaces, such as a parallel port, an IEEE 1394 serial port, a game port, a USB port, an IR interface, a BLUETOOTH® interface, etc.

A monitor 1746 or other type of display device can be also connected to the system bus 1708 via an interface, such as a video adapter 1748. In addition to the monitor 1746, a computer typically includes other peripheral output devices (not shown), such as speakers, printers, etc.

The computer 1702 can operate in a networked environment using logical connections via wired and/or wireless communications to one or more remote computers, such as a remote computer(s) 1750. The remote computer(s) 1750 can be a workstation, a server computer, a router, a personal computer, portable computer, microprocessor-based entertainment appliance, a peer device or other common network node, and typically includes many or all of the elements described relative to the computer 1702, although, for purposes of brevity, only a memory/storage device 1752 is illustrated. The logical connections depicted include wired/wireless connectivity to a local area network (LAN) 1754 and/or larger networks, e.g., a wide area network (WAN) 1756. Such LAN and WAN networking environments are commonplace in offices and companies, and facilitate enterprise-wide computer networks, such as intranets, all of which can connect to a global communications network, e.g., the Internet.

When used in a LAN networking environment, the computer 1702 can be connected to the local network 1754 through a wired and/or wireless communication network interface or adapter 1758. The adapter 1758 can facilitate wired or wireless communication to the LAN 1754, which can also include a wireless access point (AP) disposed thereon for communicating with the adapter 1758 in a wireless mode.

When used in a WAN networking environment, the computer 1702 can include a modem 1760 or can be connected to a communications server on the WAN 1756 via other means for establishing communications over the WAN 1756, such as by way of the Internet. The modem 1760, which can be internal or external and a wired or wireless device, can be connected to the system bus 1708 via the input device interface 1744. In a networked environment, program modules depicted relative to the computer 1702 or portions thereof, can be stored in the remote memory/storage device 1752. It will be appreciated that the network connections shown are example and other means of establishing a communications link between the computers can be used.

When used in either a LAN or WAN networking environment, the computer 1702 can access cloud storage systems or other network-based storage systems in addition to, or in place of, external storage devices 1716 as described above, such as but not limited to a network virtual machine providing one or more aspects of storage or processing of information. Generally, a connection between the computer 1702 and a cloud storage system can be established over a LAN 1754 or WAN 1756 e.g., by the adapter 1758 or modem 1760, respectively. Upon connecting the computer 1702 to an associated cloud storage system, the external storage interface 1726 can, with the aid of the adapter 1758 and/or modem 1760, manage storage provided by the cloud storage system as it would other types of external storage. For instance, the external storage interface 1726 can be configured to provide access to cloud storage sources as if those sources were physically connected to the computer 1702.

The computer 1702 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or can include a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can include a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device," "user equipment" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, 6G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating link adaptation of downlink control channel for 5G systems are desired. As used herein, one or more aspects of a 5G network can include, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A computer-executable method, comprising:
receiving, by a system comprising a processor, input data including a plurality of categorical variables and an output data including a single target numerical variable, wherein the plurality of categorical variables comprises a first categorical variable and a second categorical variable;
building, by the system, a predictive model configured to:
estimate significance of each categorical variable to the single target numerical variable by converting each categorical variable to each numerical variable, wherein the converting comprises:
determining, by the system, a list of unique values of each categorical variable;
calculating, by the system, respective mean values of the single target numerical variable for unique values in the list of unique values of each categorical variable; and
sorting, by the system, the list of unique values by the respective mean values, resulting in each sorted list, wherein each sorted list corresponds to each numerical variable;
calculate, by the system, respective derivatives of the respective mean values in each sorted list considering the respective mean values as a function and a number of the respective mean values in each sorted list as an independent variable;
determine, by the system, a minimum derivative value over a sorted list of the first categorical variable, wherein the minimum derivative value indicates a most significant categorical feature;
determine, by the system, a maximum derivative value over a sorted list of the second categorical variable, wherein the maximum derivative value indicates a least significant categorical feature;
output, by the system, an output data including the first categorical variable and excluding the second categorical variable; and
generating, by the system, one or more predictive models using the output data to automatically implement one or more actions in a network process operated by network equipment with respect to the single target numerical variable.

2. The method of claim 1, wherein the determining the minimum derivative value further comprises:
determining a respective slope of a respective mean value; and
determining a minimum value of the respective slope of the respective mean value.

3. The method of claim 1, wherein the calculating of the respective derivatives comprises:
calculating the respective derivatives as a slope based on determining a ratio of a mean values change to an item number change between any two items on the sorted list.

4. The method of claim 1, further comprising:
calculating, by the system, a quadratic mean value of the single target numerical variable for each unique value of each categorical variable.

5. The method of claim 1, further comprising:
calculating, by the system, an arithmetic mean value of the single target numerical variable for each unique value of each categorical variable.

6. The method of claim 1, further comprising:
calculating, by the system, a geometric mean value of the single target numerical variable for each unique value of each categorical variable.

7. The method of claim 1, further comprising:
calculating, by the system, a weighted arithmetic mean value of the single target numerical variable for each unique value of each categorical variable.

8. The method of claim 1, further comprising:
calculating, by the system, a weighted arithmetic mean value of the single target numerical variable normalized by a normalization process.

9. A system, comprising:
a processor; and
a memory that stores executable instructions that when executed by the processor, facilitate performance of operations, comprising:
receiving input data including a plurality of categorical variables and a single target numerical variable, wherein the plurality of categorical variables comprises a first categorical variable and a second categorical variable;
building a predictive model configured to:
estimate a respective significance of the plurality of categorical variables by converting each categorical variable to each numerical variable, wherein the converting comprises:
determining, by the system, a list of unique values of each of the plurality of categorical variables;
calculating, by the system, respective mean values of the single target numerical variable for unique values in the list of unique values of each categorical variable; and
sorting, by the system, the list of unique values by the respective mean values, resulting in each sorted list, wherein each sorted list corresponds to each numeral variable;
calculate, by the system, respective derivatives of the respective mean values in each sorted list considering the respective mean values as a function and a number of the respective mean values in each sorted list as an independent variable;
determine, by the system, a minimum derivative value over a sorted list of the first categorical variable, wherein the minimum derivative value indicates a most significant categorical feature;
determine, by the system, a maximum derivative value over a sorted list of the second categorical variable, wherein the maximum derivative value indicates a least significant categorical feature; and
output an output data including the first categorical variable and excluding the second categorical variable; and
generating one or more predictive models using the output data to automatically implement one or more actions in a network process operated by network equipment with respect to the single target numerical variable.

10. The system of claim 9, wherein the determining the minimum derivative value further comprises:
determining a respective slope of a respective mean value; and
determining a minimum value of the respective slope of the respective mean value.

11. The system of claim 9, wherein the operations further comprises determining a variable significance value of the first categorical variable.

12. The system of claim 9, wherein the operations further comprises:
calculating a quadratic mean value of the single target numerical variable for each unique value of each categorical variable.

13. A non-transitory machine-readable medium, comprising executable instructions that, when executed by a processing system including a processor, facilitate performance of operations, the operations comprising:
receiving input data including a plurality of categorical variables and an output data including a single target numerical variable, wherein the plurality of categorical variables comprises a first categorical variable and a second categorical variable;
building a predictive model configured to:
estimate significance of each categorical variable to the single target numeral variable by converting each categorical variable to each numeral variable, wherein the converting further comprises;
determining a list of unique values of each of the plurality of categorical variables;
calculating respective mean values of the single target numerical variable for unique values in the list of unique values of each categorical variable; and
sorting the list of unique values by the respective mean values, resulting in each sorted list, wherein each sorted list corresponds to each numeral variable;
calculate respective derivatives of the respective mean values in each sorted list considering the respective mean values as a function and a number of the respective mean values in each sorted list as an independent variable;
determine a minimum derivative value over a sorted list of the first categorical variable, wherein the minimum derivative value indicates a most significant categorical feature;
determine a maximum derivative value over a sorted list of the second categorical variable, wherein the maximum derivative value indicates a least significant categorical feature; and
output an output data including the first categorical variable and excluding the second categorical variable; and
generating one or more predictive models using the output data to automatically implement one or more actions in a network process operated by network equipment with respect to the single target numerical variable.

14. The non-transitory machine-readable medium of claim 13, wherein the determining the minimum derivative value further comprises:
determining a respective slope of a respective mean value; and
determining a minimum value of the respective slope of the respective mean value.

15. The non-transitory machine-readable medium of claim 13, wherein the calculating of the respective derivatives comprises:
calculating the respective derivatives as a slope based on determining a ratio of a mean values change to an item number change between any two items on the sorted list.

16. The non-transitory machine-readable medium of claim 13, further comprising:
calculating a quadratic mean value of the single target numerical variable for each unique value of each categorical variable.

17. The non-transitory machine-readable medium of claim 13, further comprising:
calculating an arithmetic mean value of the single target numerical variable for each unique value of each categorical variable.

18. The non-transitory machine-readable medium of claim 13, further comprising:
calculating a geometric mean value of the single target numerical variable for each unique value of each categorical variable.

19. The non-transitory machine-readable medium of claim 13, further comprising:
calculating a weighted arithmetic mean value of the single target numerical variable for each unique value of each categorical variable.

20. The non-transitory machine-readable medium of claim 13, further comprising:
calculating a weighted arithmetic mean value of the single target numerical variable normalized by a normalization process.

* * * * *